(12) United States Patent
Nilsson et al.

(10) Patent No.: US 10,267,198 B2
(45) Date of Patent: *Apr. 23, 2019

(54) DEVICE AND METHOD FOR IMPACTING THE AMOUNT OF NITROGEN OXIDES IN EXHAUST GASES FROM AN INTERNAL COMBUSTION ENGINE

(71) Applicant: Scania CV AB, Södertälje (SE)

(72) Inventors: Magnus Nilsson, Årsta (SE); Henrik Birgersson, Stockholm (SE)

(73) Assignee: Scania CV AB, Södertälje (SE)

( * ) Notice: Subject to any disclaimer, the term of this patent is extended or adjusted under 35 U.S.C. 154(b) by 177 days.

This patent is subject to a terminal disclaimer.

(21) Appl. No.: 15/120,107

(22) PCT Filed: Feb. 27, 2015

(86) PCT No.: PCT/SE2015/050226
§ 371 (c)(1),
(2) Date: Aug. 18, 2016

(87) PCT Pub. No.: WO2015/130217
PCT Pub. Date: Sep. 3, 2015

(65) Prior Publication Data
US 2017/0030235 A1    Feb. 2, 2017

(30) Foreign Application Priority Data

Feb. 28, 2014  (SE) ........................ 1450229
Feb. 28, 2014  (SE) ........................ 1450230

(51) Int. Cl.
*F01N 13/00* (2010.01)
*F01N 3/20* (2006.01)
(Continued)

(52) U.S. Cl.
CPC .......... *F01N 3/208* (2013.01); *B01D 46/0027* (2013.01); *B01D 46/0061* (2013.01);
(Continued)

(58) Field of Classification Search
CPC ............ B01D 46/0027; B01D 46/0061; B01D 53/9418; B01D 53/9495; B01D 2279/30;
(Continued)

(56) References Cited

U.S. PATENT DOCUMENTS 5,120,695 A   6/1992  Blumrich et al.
5,239,860 A   8/1993  Harris et al.
(Continued)

FOREIGN PATENT DOCUMENTS

CN   201513221 U   6/2010
CN   103442805     12/2013
(Continued)

OTHER PUBLICATIONS

International Search Report and Written Opinion of the International Searching Authority for PCT/SE2015/050226 dated Jun. 12, 2015.
(Continued)

*Primary Examiner* — Brandon D Lee
(74) *Attorney, Agent, or Firm* — Moore & Van Allen PLLC; W. Kevin Ransom

(57) ABSTRACT

A method and an exhaust treatment system are provided for treatment of an exhaust stream that comprises nitrogen oxides $NO_x$. The method comprises using a first slip-catalyst $SC_1$, arranged at a first device to create a first impact on a first amount of nitrogen oxides $NO_{x\_1}$. An $NO_x$-storing catalyst may store nitrogen oxides $NO_x$. The first slip-catalyst $SC_1$ may reduce nitrogen oxides $NO_x$, and/or oxidize potential additive in the exhaust stream. This first impact is actively controlled, based on the first amount of (Continued)

nitrogen oxides $NO_{x\_1}$ reaching the first device. The method also comprises a second impact on a second amount of nitrogen oxides $NO_{x\_2}$ reaching a second device. The active control of the first impact may be by active control of the dosage of additive at the first device, and/or through an active control of an exhaust environment, for example, a temperature for the exhaust stream.

35 Claims, 5 Drawing Sheets

(51) Int. Cl.
| | |
|---|---|
| F01N 3/021 | (2006.01) |
| F01N 3/035 | (2006.01) |
| F01N 3/10 | (2006.01) |
| B01D 46/00 | (2006.01) |
| B01D 53/94 | (2006.01) |
| F01N 11/00 | (2006.01) |
| F01N 9/00 | (2006.01) |
| F01N 3/023 | (2006.01) |

(52) U.S. Cl.
CPC ..... *B01D 53/9418* (2013.01); *B01D 53/9495* (2013.01); *F01N 3/021* (2013.01); *F01N 3/023* (2013.01); *F01N 3/035* (2013.01); *F01N 3/103* (2013.01); *F01N 3/106* (2013.01); *F01N 3/2066* (2013.01); *F01N 9/00* (2013.01); *F01N 11/002* (2013.01); *F01N 13/009* (2014.06); *F01N 13/0093* (2014.06); *F01N 13/0097* (2014.06); *B01D 2279/30* (2013.01); *F01N 2430/00* (2013.01); *F01N 2510/06* (2013.01); *F01N 2570/14* (2013.01); *F01N 2590/08* (2013.01); *F01N 2610/02* (2013.01); *F01N 2610/144* (2013.01); *F01N 2900/04* (2013.01); *F01N 2900/14* (2013.01); *F01N 2900/1402* (2013.01); *F01N 2900/1404* (2013.01); *F01N 2900/1616* (2013.01); *Y02A 50/2344* (2018.01); *Y02T 10/24* (2013.01); *Y02T 10/47* (2013.01)

(58) Field of Classification Search
CPC .. F01N 11/002; F01N 13/009; F01N 13/0093; F01N 13/0097; F01N 3/021; F01N 3/023; F01N 3/035; F01N 3/103; F01N 3/106; F01N 3/2066; F01N 3/208; F01N 9/00; F01N 2430/00; F01N 2510/06; F01N 2570/14; F01N 2590/08; F01N 2610/02; F01N 2610/144; F01N 2900/04; F01N 2900/14; F01N 2900/1402; F01N 2900/1404; F01N 2900/1616; Y02A 50/2344; Y02T 10/24; Y02T 10/47
See application file for complete search history.

(56) References Cited

U.S. PATENT DOCUMENTS

| | | | |
|---|---|---|---|
| 7,559,194 | B2 | 7/2009 | Westerberg |
| 8,544,260 | B2 | 10/2013 | Boorse et al. |
| 9,573,097 | B2 | 2/2017 | Reichinger et al. |
| 9,670,855 | B2 | 6/2017 | Dickson et al. |
| 2004/0040289 | A1 | 3/2004 | Mazur et al. |
| 2004/0098979 | A1 | 5/2004 | Hammerle et al. |
| 2005/0069476 | A1 | 3/2005 | Blakeman et al. |
| 2005/0232830 | A1 | 10/2005 | Brueck |
| 2006/0039843 | A1 | 2/2006 | Patchett et al. |
| 2007/0150154 | A1 | 6/2007 | Lenz |
| 2008/0008629 | A1 | 1/2008 | Doring et al. |
| 2008/0060348 | A1 | 3/2008 | Robel et al. |
| 2009/0035194 | A1 | 2/2009 | Robel et al. |
| 2009/0035195 | A1 | 2/2009 | Robel |
| 2010/0024393 | A1 | 2/2010 | Chi et al. |
| 2010/0050604 | A1 | 3/2010 | Hoard et al. |
| 2010/0252737 | A1 | 10/2010 | Fournel et al. |
| 2010/0319320 | A1 | 12/2010 | Mital et al. |
| 2011/0085954 | A1 | 4/2011 | Doring et al. |
| 2011/0113759 | A1 | 5/2011 | Tilinski et al. |
| 2011/0211193 | A1 | 9/2011 | Saveliev et al. |
| 2011/0271664 | A1 | 11/2011 | Boorse et al. |
| 2011/0295484 | A1 | 12/2011 | L'Henoret |
| 2011/0313635 | A1 | 12/2011 | Blanc et al. |
| 2012/0117954 | A1 | 5/2012 | Yasui et al. |
| 2012/0255286 | A1 | 10/2012 | Matsunaga et al. |
| 2013/0078173 | A1 | 3/2013 | Cox |
| 2013/0202507 | A1 | 8/2013 | Echoff et al. |
| 2013/0232953 | A1 | 9/2013 | Harmsen et al. |
| 2013/0232958 | A1 | 9/2013 | Ancimer et al. |
| 2013/0289857 | A1 | 10/2013 | Schmitt et al. |
| 2014/0052353 | A1 | 2/2014 | Sujan et al. |
| 2014/0056789 | A1 | 2/2014 | Mussmann et al. |
| 2014/0065044 | A1 | 3/2014 | Ito et al. |
| 2014/0229010 | A1 | 8/2014 | Farquharson et al. |
| 2015/0052878 | A1 | 2/2015 | Qi |
| 2015/0131093 | A1 | 5/2015 | Saptari |
| 2015/0337702 | A1 | 11/2015 | Ettireddy et al. |
| 2016/0166990 | A1* | 6/2016 | Phillips ................ F01N 3/2066 423/239.1 |

FOREIGN PATENT DOCUMENTS

| | | | |
|---|---|---|---|
| DE | 3733501 | A1 | 4/1989 |
| DE | 102006031650 | A1 | 1/2008 |
| DE | 102008026191 | A1 | 1/2009 |
| DE | 102009038835 | A1 | 3/2011 |
| DE | 102010050312 | A1 | 5/2012 |
| DE | 102012201809 | A1 | 9/2012 |
| DE | 202013101028 | U1 | 5/2013 |
| DE | 102015015260 | A1 | 6/2017 |
| EP | 1181531 | A1 | 2/2002 |
| EP | 2390480 | A1 | 11/2011 |
| KR | 20140143145 | A1 | 12/2014 |
| RU | 2354833 | C2 | 6/2010 |
| RU | 2504668 | C2 | 2/2017 |
| WO | WO0050974 | A2 | 8/2000 |
| WO | 2007104382 | A1 | 9/2007 |
| WO | 2009017639 | A1 | 2/2009 |
| WO | 2012037342 | A1 | 3/2012 |
| WO | 2013022516 | A1 | 2/2013 |
| WO | 2013095214 | A1 | 6/2013 |
| WO | 2013100846 | A1 | 7/2013 |
| WO | 2014016616 | A9 | 1/2014 |
| WO | 2014149297 | A1 | 9/2014 |

OTHER PUBLICATIONS

International Preliminary Report on Patentability of PCT/SE2015/050226 dated Apr. 26, 2016.
Botar-Jid, Claudiu Cristian (2007)—Selective catalytic reduction of nitrogen oxides with ammonia in forced unsteady state reactors—Case based reasoning and mathematical model simulation reasoning; Retrieved online from http://urn.fi/URN:ISBN:978-952-214-469-0; p. 3, second paragraph.
NOx Controls; EPA/452/B-02-001 Section 4—Retrieved online on Jun. 5, 2015 from http://www.epa.gov/ttncatc1/dir1/cs4-2ch2.pdf; pp. 2-6, third paragraph.
European Search Report for European Patent Application No. PCT/SE2015050226 dated Sep. 12, 2017.
Korean Office Action for Korean Patent Application No. 10-2016-7026603 dated Apr. 23, 2018.
Russian Office Action for Russian Patent Application No. 2016137489/20(059148) dated Apr. 2, 2018.
First Examination Report from the Indian Patent Office for Patent Application No. 201617023647 dated Sep. 25, 2018.

* cited by examiner

DEVICE AND METHOD FOR IMPACTING THE AMOUNT OF NITROGEN OXIDES IN EXHAUST GASES FROM AN INTERNAL COMBUSTION ENGINE

CROSS-REFERENCE TO RELATED APPLICATIONS

This application is a national stage application (filed under 35 § U.S.C. 371) of PCT/SE15/050226, filed Feb. 27, 2015 of the same title, which, in turn, claims priority to Swedish Application Nos. SE1450229-8 and SE1450230-6, both filed Feb. 28, 2014 of the same title; the contents of each of which are hereby incorporated by reference.

FIELD OF THE INVENTION

The present invention relates to a method, system, computer program product for treatment of an exhaust stream.

BACKGROUND

The following background description constitutes a description of the background to the present invention, and thus need not necessarily constitute prior art.

In connection with increased government interests concerning pollution and air quality, primarily in urban areas, emission standards and regulations regarding emissions from combustion engines have been drafted in many jurisdictions.

Such emission standards often consist of requirements defining acceptable limits of exhaust emissions from combustion engines in, for example, vehicles. For example, emission levels of nitrogen oxides $NO_x$, hydrocarbons $C_xH_y$, carbon monoxide CO and particles PM are often regulated by such standards for most types of vehicles. Vehicles equipped with combustion engines typically give rise to such emissions in varying degrees. In this document, the invention will be described mainly for its application in vehicles. However, the invention may be used in substantially all applications where combustion engines are used, for example in vessels such as ships or aeroplanes/helicopters, wherein regulations and standards for such applications limit emissions from the combustion engines.

In an effort to comply with these emission standards, the exhausts caused by the combustion of the combustion engine are treated (purified).

A common way of treating exhausts from a combustion engine consists of a so-called catalytic purification process, which is why vehicles equipped with a combustion engine usually comprise at least one catalyst. There are different types of catalysts, where the different respective types may be suitable depending on for example the combustion concept, combustion strategies and/or fuel types which are used in the vehicles, and/or the types of compounds in the exhaust stream to be purified. In relation to at least nitrous gases (nitrogen monoxide, nitrogen dioxide), referred to below as nitrogen oxides $NO_x$, vehicles often comprise a catalyst, wherein an additive is supplied to the exhaust stream resulting from the combustion in the combustion engine, in order to reduce nitrogen oxides $NO_x$, primarily to nitrogen gas and aqueous vapor.

SCR (Selective Catalytic Reduction) catalysts are a commonly used type of catalyst for this type of reduction, primarily for heavy goods vehicles. SCR catalysts usually use ammonia $NH_3$, or a composition from which ammonia may be generated/formed, as an additive to reduce the amount of nitrogen oxides $NO_x$ in the exhausts. The additive is injected into the exhaust stream resulting from the combustion engine upstream of the catalyst. The additive added to the catalyst is adsorbed (stored) in the catalyst, in the form of ammonia $NH_3$, so that a redox-reaction may occur between nitrogen oxides $NO_x$ in the exhausts and ammonia $NH_3$ available via the additive.

A modern combustion engine is a system where there is cooperation and mutual impact between the engine and the exhaust treatment. Specifically, there is a correlation between the exhaust treatment system's ability to reduce nitrogen oxides $NO_x$ and the fuel efficiency of the combustion engine. For the combustion engine, there is a correlation between the engine's fuel efficiency/total efficiency and the nitrogen oxides $NO_x$ produced by it. This correlation specifies that for a given system there is a positive correlation between nitrogen oxides $NO_x$ produced and fuel efficiency, in other words an engine that is permitted to emit more nitrogen oxides $NO_x$ may be induced to consume less fuel by way of, for example, a more optimal selection of the injection timing, which may yield a higher combustion efficiency. Similarly, there is often a negative correlation between a produced particle mass PM and the fuel efficiency, meaning that an increased emission of particle mass PM from the engine is connected with an increased fuel consumption. This correlation is the background to the widespread use of exhaust treatment systems comprising an SCR-catalyst, where the intention is the optimization of the engine regarding fuel consumption and emission of particles, towards a relatively larger amount of nitrogen oxides $NO_x$ produced. A reduction of these nitrogen oxides $NO_x$ is then carried out in the exhaust treatment system, which thus may also comprise an SCR catalyst. Through an integrated approach in the design of the engine and exhaust treatment system, where the engine and exhaust treatment complement each other, a high fuel efficiency may therefore be achieved jointly with low emissions of both particles PM as well as nitrogen oxides $NO_x$.

BRIEF DESCRIPTION OF THE INVENTION

The performance for a reduction of nitrogen oxides $NO_x$ that may be obtained in the exhaust treatment, for example over the SCR-catalysts, is heavily dependent on the temperature of the exhausts at the reduction. The exhaust temperature is therefore an important parameter for achieving a high efficiency, and/or utilization, of the exhaust treatment system. A high exhaust temperature may, however, thermodynamically entail that a smaller fraction of the fuel energy is utilized in the form of useful work, provided via the engine's crank shaft. There is also a reverse relationship between an optimization of fuel consumption and a high efficiency of the exhaust treatment.

To a certain extent, the performance for the exhaust treatment may be improved by increasing the substrate volumes. In particular, the losses due to an uneven distribution of the exhaust flow may be reduced. However, larger substrate volumes result in a direct impact on the cost of manufacture and/or production. A larger substrate volume also results in a greater back pressure, which counteracts potential gains in fuel consumption, due to the higher conversion degree caused by the increased volume.

A traditional exhaust treatment system generates a substantially constant fraction of nitrogen dioxide $NO_2$ in the nitrogen oxides $NO_x$ for a given exhaust flow and a given temperature. The optimization of these components is difficult, since these parameters will depend on the manner in which the engine is used, and may not be controlled. Reduction catalysts in the exhaust treatment systems need, on the one hand, a sufficiently high fraction of nitrogen dioxide $NO_2$ at low exhaust temperatures, but, on the other hand, their function deteriorates if, at an optimal temperature for an oxidation catalyst DOC and for a particulate filter DPF in the exhaust treatment system, the fraction of nitrogen dioxide $NO_2$ becomes too high. Exhaust treatment systems of today may therefore suffer from both too large/too high fractions of nitrogen dioxide $NO_2$, and too small/too low fractions of nitrogen dioxide $NO_2$, depending on the current operation and/or hardware specification for the respective component.

In some conditions applying to the catalyst temperature and flow, i.e. at a certain dwell-time in the catalyst ("Space Velocity"), there is a risk that a non-advantageous fraction of nitrogen dioxides $NO_2$ is obtained. Specifically, there is a risk that the ratio $NO_2/NO_x$ exceeds the value by 50%, which may constitute a real problem for the exhaust purification. An optimization of the ratio $NO_2/NO_x$ for critical operating modes with low temperatures thus risk, with prior art solutions, giving too high a fraction of nitrogen dioxides $NO_2$ in other operating modes at higher temperatures. Such a higher fraction of nitrogen dioxides $NO_2$ results in a greater volume requirement for the SCR-catalyst, and/or in a limitation of the amount of nitrogen oxides emitted from the engine, and accordingly a poorer fuel efficiency for the vehicle/engine. Additionally, there is a risk that the higher fraction of nitrogen dioxide $NO_2$ also results in production of laughing gas $N_2O$ in a selective catalytic reduction catalyst, potentially arranged downstream.

High fractions of nitrogen oxides $NO_2$ in the nitrogen oxides $NO_x$ also entail that the kinetic activities of the SCR-catalyst are limited. Adaptations of the urea dosage, which occur during a relatively brief time period, in this case also run a risk of not giving correct results because of a reduced catalytic efficiency of the SCR-catalyst.

Overall, this means that it is difficult to find a solution to achieve both an optimized fuel consumption, and an efficient exhaust treatment. This means that it becomes very important to be able to use the system in as optimal a manner as possible, with respect to both fuel consumption and the exhaust treatment. There is accordingly a need for an optimization of the function in exhaust treatment systems.

Therefore, one objective of the present invention is to provide a method and a system which may provide a high performance and a good function under varying conditions.

This objective is achieved through the method, system, and computer program product described herein.

According to the present invention a method and an exhaust treatment system are provided for treatment of an exhaust stream, which results from a combustion in a combustion engine and comprises nitrogen oxides $NO_x$.

A first impact on a first amount of nitrogen oxides $NO_{x\_1}$ reaching a first device, arranged in the exhaust treatment system, is carried out in order to impact the first amount of nitrogen oxides $NO_{x\_1}$. This first impact is implemented through the use of at least one of a $NO_x$-storing catalyst NCC and a first slip-catalyst $SC_1$, arranged in the first device. An $NO_x$-storing catalyst NCC may here effect a storage of nitrogen oxides $NO_x$. The first slip-catalyst $SC_1$ may effect a reduction of nitrogen oxides $NO_x$, and/or an oxidation of potential additive in the exhaust stream through the exhaust system.

This first impact is actively controlled, based at least on the first amount of nitrogen oxides $NO_{x\_1}$ reaching the first device.

A second impact on a second amount of nitrogen oxides $NO_{x\_2}$ reaching a second device, arranged downstream of the first device, is effected in order to impact the second amount of nitrogen oxides $NO_{x\_2}$.

The active control of the first impact may, according to different embodiments of the present invention, be carried out through an active control of the dosage of additive at the first device, and/or through an active control of an exhaust environment, comprising for example a temperature for the exhaust stream at the first device. The exhaust environment may here, for example, be oxidizing, with good access to air, or it may be reducing, with poorer access to air. Fuel injection into the engine may thus impact the exhaust environment.

The active control of the temperature may, according to different embodiments of the present invention, be controlled by adjusting the air/fuel-ratio (the lambda value) in the combustion engine, wherein a reduced air flow increases the temperature, and an increased air flow reduces the temperature. The air/fuel ratio may for example be changed by changing the combustion mode of the engine.

The air flow through, and accordingly also the temperature for, the exhaust treatment system may also be controlled by controlling a gearbox in the vehicle, since the use of different gears results in different air flows through the exhaust treatment system.

The $NO_x$-storing catalyst NCC may have the characteristic that it stores $NO_x$ at lower temperatures, and releases $NO_x$ at higher temperatures. The present invention generally provides a control of a ratio $NO_2/NO_x$, between the amount of nitrogen dioxide $NO_2$ and the amount of nitrogen oxides $NO_x$. Thus, for example, high values for this ratio may be avoided through the active control, for example $NO_2/NO_x>50\%$ may be avoided, since the value for the ratio may be actively controlled to be reduced. The value for the ratio $NO_2/NO_x$ may also be increased when the value is too low, for example if $NO_2/NO_x<50\%$.

Through the use of the present invention, the fraction of nitrogen oxides $NO_x$ consisting of nitrogen dioxide $NO_2$ may thus be actively controlled, which is facilitated by an active control of the amount of nitrogen oxides $NO_x$ upstream of at least one substrate with oxidizing coating, for example comprising precious metals, in the exhaust treatment system. This control of the ratio $NO_2/NO_x$ may, apart from advantages in catalytic performance, such as higher $NO_x$-conversion, also provide for a possibility of reducing emissions, specifically of nitrogen dioxide $NO_2$, which result in a very poisonous and strong smelling emission. This may result in advantages at a potential future introduction of a separate legal requirement relating to nitrogen dioxide $NO_2$, through a possibility of reducing emissions of nitrogen dioxide $NO_2$. This may be compared with for example the Euro VI-system, in which the fraction of nitrogen dioxide $NO_2$ provided at exhaust purification may not be directly impacted in the exhaust treatment system itself, since the fraction of nitrogen dioxide $NO_2$ in the Euro VI-system is due to usage/operation, and may not be controlled in any other way.

In other words, the active control of the level of nitrogen dioxide $NO_2$ is facilitated at the use of the present invention, which is used to increase or reduce the level of nitrogen dioxide $NO_2$ in the driving modes for which this is necessary. Thus, an exhaust treatment system may be created which requires less precious metal, and accordingly also is cheaper to manufacture.

Through the use of the control according to the present invention, a fuel consumption neutral manner of increasing the reaction speed over one or several selective catalytic reduction catalysts in the exhaust treatment system is obtained, since the control may be carried out in such a way that as large a fraction as possible of the reduction occurs via reaction paths over both nitrogen oxide NO and nitrogen dioxide $NO_2$. Thus, through the control according to the invention, the fraction of the total conversion of nitrogen oxides $NO_x$ occurring via a fast reaction path, that is to say via a "fast SCR", wherein the reduction occurs via reaction paths over both nitrogen oxide NO and nitrogen dioxide $NO_2$, may be increased through active control of the level of nitrogen dioxide $NO_2$. Accordingly, the volume requirements relating to the catalyst may also be reduced. Fast SCR is described in further detail below.

The ratio $NO_2/NO_x$ may, due to ageing, assume lower values, for example after the exhaust treatment system has been in operation for some time. There is accordingly a risk that a non-advantageous fraction of nitrogen dioxide $NO_2$ of the nitrogen oxides $NO_x$ may arise, because of ageing/degrading of the exhaust treatment system. For example, the ratio $NO_2/NO_x$ may assume lower values when the exhaust treatment system has aged, which may entail that a catalyst specification which, in a non-aged/new state, results in too high fractions of $NO_2/NO_x$, must be used to compensate for ageing/degradation.

The present invention provides for a possibility of preventing this time deterioration characteristic, which is negative for the exhaust treatment system, by preventing excessively low values for the ratio $NO_2/NO_x$ with the active control according to the invention. Since it is possible, when the present invention is used, to handle higher initial values for the ratio $NO_2/NO_x$, there are better conditions for optimizing performance for both new and aged exhaust treatment systems.

The present invention uses the fact that the catalytic activity obtained at a given temperature may be impacted, if the composition of the exhausts deteriorates. By adjusting the fraction of nitrogen oxides $NO_x$ that constitute nitrogen dioxides $NO_2$, an impact of the reactions that are the basis of the reduction may be achieved. In other words, the reduction catalyst's activity may be impacted by an adjustment of the fraction of nitrogen oxides $NO_x$ consisting of nitrogen dioxide $NO_2$. A fraction of the nitrogen oxides $NO_x$, consisting of nitrogen dioxide $NO_2$ representing 50% results, according to different embodiments of the present invention, in the fastest kinetics and/or the best catalytic performance, and therefore results in the smallest requirements relating to substrate volumes for the reduction catalyst. Additionally, a control according to the invention, towards a suitable value for the fraction of the nitrogen oxides $NO_x$ consisting of nitrogen dioxides $NO_2$, means that the requirements regarding a potential slip-catalyst SC, arranged downstream in the exhaust treatment system, are lower.

By actively controlling the level of nitrogen oxides $NO_x$ reaching the one or several substrates with an oxidizing coating in the exhaust treatment system, which may for example be comprised in an oxidation catalyst DOC, and/or in an at least partly coated filter cDPF, an adjustment of the fraction of nitrogen dioxide $NO_2$ reaching a first and/or a second device, arranged downstream of the oxidizing coating, may be obtained. This means that the second device provides a more predictable turnover. This concerns, for example, an increase of the amount of nitrogen oxides $NO_x$ produced by the engine, in cases where there is a risk that the nitrogen dioxide $NO_2$ fraction of the nitrogen oxides $NO_x$ may exceed a maximum value.

By using the present invention, a more efficient and predictable reduction of nitrogen oxides $NO_x$ is obtained. As a result, for example, adaptations of urea dosage give more reliable results.

The active control according to the present invention has potential to facilitate that the exhaust treatment system may fulfil emission requirements in the Euro VI emission standard. Additionally, the control according to the present invention has potential to facilitate that the exhaust treatment system is able to meet the emission requirements in several other existing, and/or future emission standards.

This means that the present invention may provide the required impact, such as for example the required reduction of nitrogen oxides $NO_x$ in the exhaust stream, under a large number of different conditions. Accordingly, legal requirements, and/or standards for emissions of nitrogen oxides $NO_x$ from the exhaust treatment system, may be fulfilled in many more conditions and/or driving modes than when prior art system were used.

Through the use of the present invention, a better fuel optimization may be obtained for the vehicle, since there is thus potential to control the engine in a more fuel efficient manner, so that a higher efficiency for the engine is obtained. Thus, a performance gain, and/or a reduced emission of carbon dioxide $CO_2$, may be obtained when the present invention is used.

The present invention also has an advantage in that two cooperating dosage devices are used in combination for the dosage of a reductant, for example urea, upstream of the first and second devices, which relieves and facilitates mixture and potential vaporization of the reductant, since the injection of the reductant is divided between two physically separate positions. This reduces the risk of the reductant cooling down the exhaust treatment system locally, which may potentially form deposits at the positions where the reductant is injected, or downstream of such positions.

BRIEF LIST OF FIGURES

The invention will be illustrated in more detail below, along with the enclosed drawings, where similar references are used for similar parts, and where:

DESCRIPTION OF PREFERRED EMBODIMENTS

Figure 1:
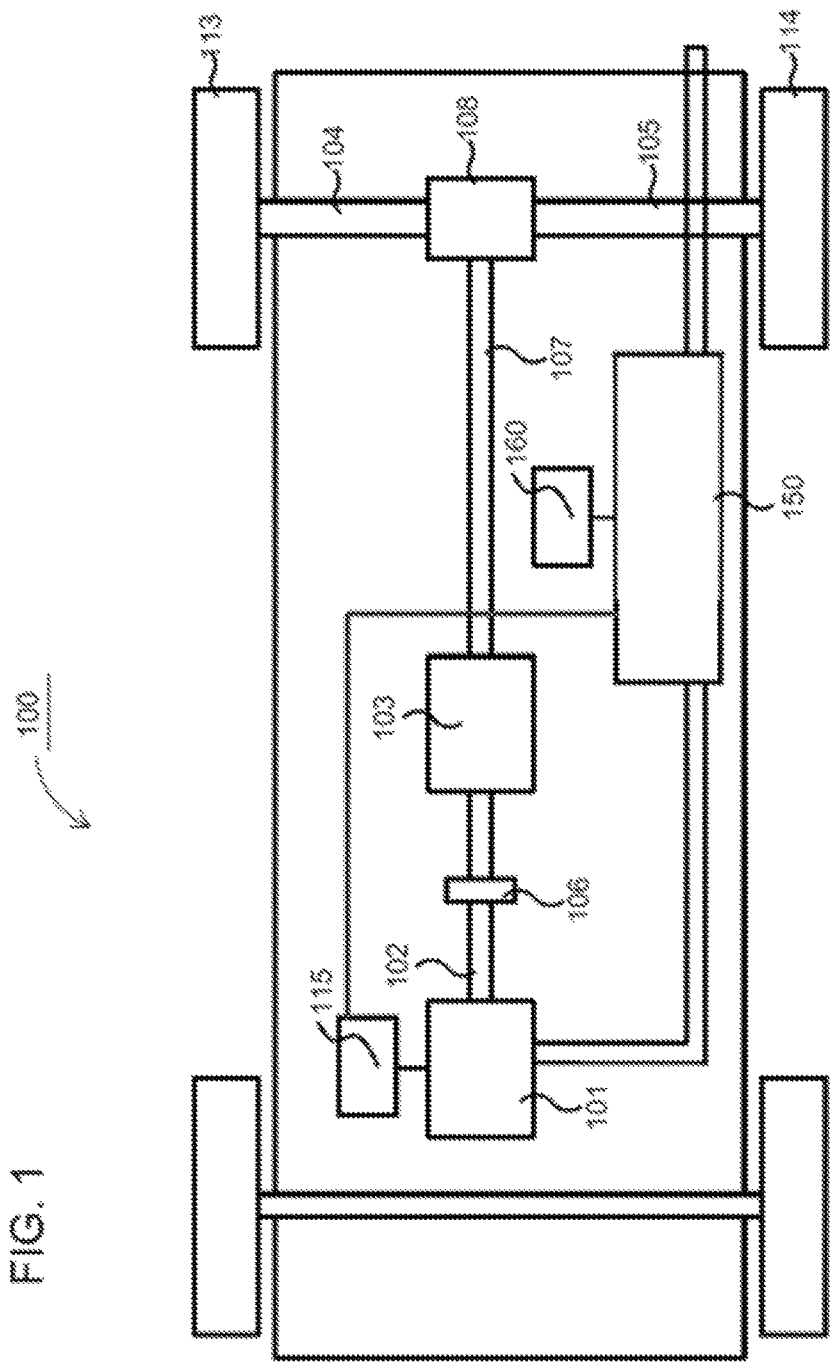
FIG. 1 shows an example vehicle which may comprise the present invention.

FIG. 1 schematically shows an example vehicle 100 comprising an exhaust treatment system 150, which may be an exhaust treatment system 150 according to one embodiment of the present invention. The power-train comprises a combustion engine 101, which in a customary manner, via an output shaft 102 on the combustion engine 101, usually via a flywheel, is connected to a gearbox 103 via a clutch 106.

The combustion engine 101 is controlled by the engine's control system via a control device 115. Likewise, the clutch 106 and the gearbox 103 may be controlled by the vehicle's control system, with the help of one or more applicable control devices (not shown). Naturally, the vehicle's powertrain may also be of another type, such as a type with a conventional automatic gearbox, of a type with a hybrid power-train, etc.

An output shaft 107 from the gearbox 103 drives the wheels 113, 114 via a final drive 108, such as e.g. a customary differential, and the drive shafts 104, 105 connected to the said final drive 108.

The vehicle 100 also comprises an exhaust treatment system/exhaust purification system 150 for treatment/purification of exhaust emissions resulting from combustion in the combustion chamber of the combustion engine 101, which may consist of cylinders. The exhaust treatment system 150 may be controlled by the vehicle's control system via a control device 160, which may also be connected to the engine, and/or to an engine control device 115.

Figure 2:
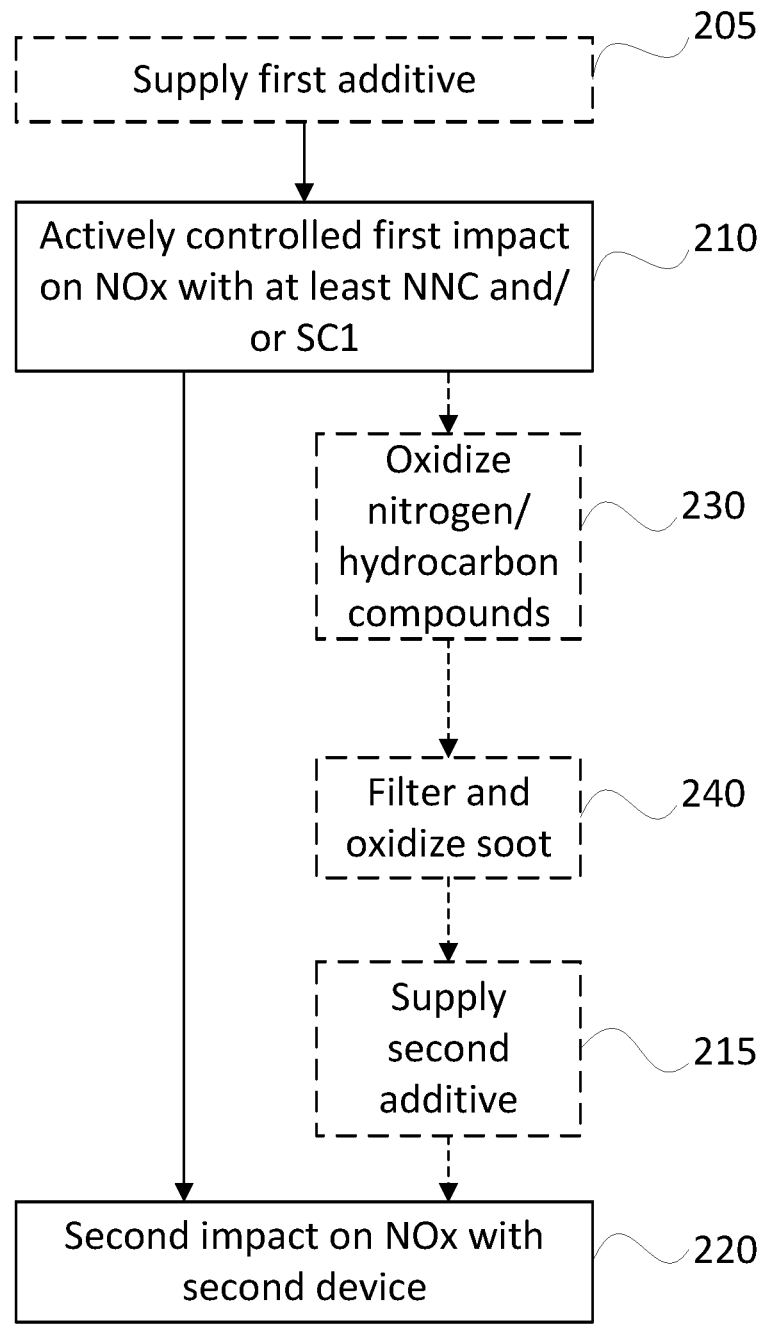
FIG. 2 shows a flow chart for the method for exhaust treatment according to the invention.

According to the present invention, a method is provided for the treatment of an exhaust stream, which results from a combustion in a combustion engine and comprises nitrogen oxides $NO_x$. As mentioned above, nitrogen oxides $NO_x$ comprise nitrogen monoxide NO and nitrogen dioxide $NO_2$. This method may be illustrated with the flow chart in FIG. 2.

In a first step 210 of the method, a first impact is implemented on a first amount of nitrogen oxides $NO_{x\_1}$ reaching a first device, arranged in the exhaust treatment system, in order to impact the first amount of nitrogen oxides $NO_{x\_1}$. This first impact is carried out through use at least of one $NO_x$-storing catalyst NCC, and/or of a first slip-catalyst $SC_1$, comprised in the first device. The first impact 210 may here be controlled actively, by way of an active control of the $NO_x$-storing catalyst's NCC storage of nitrogen oxides $NO_x$, and/or through an active control of the first slip-catalyst's $SC_1$ reduction of nitrogen oxides $NO_x$, and/or oxidation of potential additive in said exhaust stream. The active control of the $NO_x$-storing catalyst NCC, and/or of the first slip-catalyst $SC_1$, may be carried out based at least on the first amount of nitrogen oxides $NO_{x\_1}$ reaching the first device.

In a second step of the method 220, a second impact is implemented on a second amount of nitrogen oxides $NO_{x\_2}$ reaching a second device, arranged downstream of the first device in the exhaust treatment system, in order to impact the second amount of nitrogen oxides $NO_{x\_2}$.

In a step 205, which precedes the first step 210, according to one embodiment of the present invention, additive may be supplied into the exhaust stream, as described in more detail below.

In a step 215, which precedes the second step 220, according to one embodiment of the present invention, additive may be supplied into the exhaust stream, as described in more detail below.

According to different embodiments of the present invention, oxidation of nitrogen, and/or hydrocarbon compounds 230, and/or filtering and oxidation of soot 240, may be carried out after the first impact 210 and before the second impact 220, for example through the use of an oxidation catalyst DOC, and/or an at least partly coated filter cDPF, which is described in more detail below.

Through the use of the present invention, a control of a ratio $NO_2/NO_x$, between the amount of nitrogen dioxide $NO_2$ and the amount of nitrogen oxides $NO_x$, may be provided. Thus, for example, high values for this ratio may be avoided through the active control, for example $NO_2/NO_x>50\%$ may be avoided, since the value for the ratio may be actively controlled to be reduced. The value for the ratio $NO_2/NO_x$ may also be increased when the value is too low, for example if $NO_2/NO_x<50\%$.

In other words, the active control of the level of nitrogen dioxide $NO_2$ is facilitated at the use of the present invention, which is used to increase or reduce the level of nitrogen dioxide $NO_2$ in the driving modes for which this is necessary. Thus, an exhaust treatment system may be created, which requires less precious metal, and accordingly also is cheaper to manufacture.

Through the use of the control according to the present invention, a fuel consumption neutral manner of increasing the reaction speed over one or several selective catalytic reduction catalyst in the exhaust treatment system is obtained, since the control may be carried out in such a way that as large a fraction as possible of the reduction occurs via reaction paths over both nitrogen oxide NO and nitrogen dioxide $NO_2$. Thus, through the control according to the invention, the fraction of the total conversion of nitrogen oxides $NO_x$ occurring via a fast reaction path, that is to say via a "fast SCR", wherein the reduction occurs via reaction paths over both nitrogen oxide NO and nitrogen dioxide $NO_2$, may be increased through active control of the level of nitrogen dioxide $NO_2$. Accordingly, the volume requirements relating to the catalyst may also be reduced.

For SCR-catalysts there are primarily three different types of reaction paths defined.

One of these reaction paths is often referred to as "Standard-SCR". Here, nitrogen oxides $NO_x$ consist mainly of nitrogen monoxide NO, so that the reaction path may be written as:

$$4NH_3 + 4NO + O_2 \leftrightarrow 4N_2 + 6H_2O \qquad (i)$$

Another of these reaction paths corresponds to rapid kinetics, and is often referred to as "Fast SCR"/"fast reduction". Here, both nitrogen monoxide NO and nitrogen dioxide $NO_2$ are available in equal fractions in the nitrogen oxides $NO_x$, so that the reaction path may be written as:

$$2NH_3 + 2NO + 2NO_2 \leftrightarrow 2N_2 + 3H_2O \qquad (ii)$$

Another of these reaction paths corresponds to slow kinetics, and is often referred to as "Slow-SCR"/"slow reduction". Here, only nitrogen dioxide $NO_2$ is available for the reaction, since all nitrogen monoxide has been reduced away, and the reaction path may be written as:

$$6NO_2 + 8NH_3 \leftrightarrow 7N_2 + 12H_2O \qquad (iii)$$

At the slower kinetics in (iii) above, there is also a risk that laughing gas $N_2O$ may be produced, according to the following reaction paths:

$$8NO_2 + 6NH_3 \rightarrow 7N_2O + 9H_2O \qquad (iv)$$

$$4NO_2 + 4NH_3 + O_2 \rightarrow 4N_2O + 6H_2O \qquad (v)$$

The reaction speed for the reduction/SCR-catalyst is (as the names suggest) closely connected to the paths of the reactions. The global reduction will always be a combination of these reaction paths, and probably also of several additional reactions. Thus, the reactions in the SCR-catalyst occur via the above specified reaction paths, which have different speeds.

For exhaust temperatures above approximately 280° C., a well selected SCR catalyst will be fast via the reaction path "Standard-SCR" (i). Thus, for these higher temperatures, there is no strong dependence on/impact from the fraction of nitrogen dioxide $NO_2$.

At lower temperatures, however, too low fractions of nitrogen dioxide $NO_2$ result in a low kinetic activity, and accordingly an inefficient catalytic process. As mentioned above, there is a risk of a production of laughing gas $N_2O$ in a component arranged downstream, where the risk is particularly great, for example, regarding precious metal based catalysts, such as for a slip-catalyst SC, an oxidation catalyst DOC, and/or an at least partly coated filter cDPF.

Thus, it is advantageous to be able, through the use of the present invention, to control the fraction of nitrogen dioxide $NO_2$ in the nitrogen oxides $NO_x$, so that this is above a suitable minimum value $NO_2/NO_{xthreshold\_low}$, and below a suitable maximum value $NO_2/NO_{xthreshold\_high}$.

The thermodynamic equilibrium state between nitrogen oxides NO and nitrogen dioxide $NO_2$ means that it is problematic to control the fraction of nitrogen dioxide $NO_2$ in the nitrogen oxides $NO_x$ over a broad temperature range. Geometry, amounts and/or distribution of precious metal, and soot deposits are some of the parameters impacting the value for the ratio $NO_2/NO_x$, which is obtained downstream of oxidizing substrates in the exhaust treatment system, that is to say, for example, downstream of an oxidation catalyst and/or a particulate filter.

The present invention uses the discovery that additional possibilities are opened up for control of the fraction of nitrogen dioxide $NO_2$ in nitrogen oxides $NO_x$. In modern diesel engines. The present invention here uses the possibility of controlling the engine's level for nitrogen oxides $NO_x$. This is possible since the fraction of nitrogen dioxide $NO_2$ in the nitrogen oxides $NO_x$ depends on the level of nitrogen oxides $NO_x$.

For the embodiments described herein, where the exhaust treatment system 350 has a precious metal component, such as for example an $NO_x$-storing catalyst NCC, and/or an oxidation catalyst DOC, arranged upstream of the first device, or at the inlet in the first device, the first ratio $NO_{2\_1}/NO_{x\_1}$ reaching the first device, or components arranged downstream in the first device, may thus be controlled.

To compensate for the limited availability of heat at, for example, cold starts and operation with low load, it is desirable to use a so-called fast reduction/SCR ("Fast SCR"). At a fast reduction/SCR, the reduction is controlled to occur, to as great an extent as possible, via reaction paths over both nitrogen oxide NO and nitrogen dioxide $NO_2$. Thus, at fast reduction/SCR the reaction uses equal parts of nitrogen oxide NO and nitrogen dioxide $NO_2$, which means that an optimal value for the molar ratio $NO_2/NO_x$ may for example be close to 50%. Through the use of the present invention, the molar ratio $NO_2/NO_x$ may be controlled to be closer to this optimal value, than what would be the case if the control according to the present invention had not been used.

By using the present invention, a more efficient and predictable reduction of nitrogen dioxides $NO_x$ is thus achieved. As a result, for example, adaptations of urea dosage give more reliable results.

In this document, the term slip-catalyst SC is used generally to denote a catalyst, which is arranged to oxidize additive in the exhaust stream, and which is arranged to be able to reduce residues of nitrogen oxides $NO_x$ in the exhaust stream. In more detail, such a slip-catalyst SC is arranged primarily to reduce nitrogen oxides $NO_x$, and secondarily to oxidize additive. In other words, the slip-catalyst SC may take care of slip-residues of both additive and nitrogen oxides $NO_x$. This may also be described as the slip-catalyst SC being an extended ammoniac slip catalyst ASC, which is also set up for reduction of nitrogen oxides $NO_x$ in the exhaust stream, so that a general multifunctional slip-catalyst SC is obtained taking care of several types of slip, meaning it takes care of both additive and nitrogen oxides $NO_x$. According to one embodiment of the present invention, for example at least the following reactions may be carried out in a multifunctional slip-catalyst SC, which both reduces nitrogen oxides $NO_x$ and oxidizes additive:

and

Here, the reaction according to the equation vi provides an oxidation of the additive, for example residues of additive, which may comprise ammonia. The reaction according to the equation vii results in a reduction of nitrogen oxides $NO_x$.

Accordingly, the additive may here be oxidized in the form of as residues of ammonia $NH_3$ isocyanic acid HNCO, urea or similar. These residues of additive, that is to say ammonia $NH_3$, HNCO, urea or similar, may here also be used to oxidize nitrogen oxides $NO_x$.

In order to obtain these characteristics, that is to say to obtain a multifunctional slip-catalyst, the slip-catalyst may according to one embodiment comprise one or several substances comprised in platinum metals (PGM; Platinum Group Metals), that is to say one or several of iridium, osmium, palladium, platinum, rhodium and ruthenium. The slip-catalyst may also comprise one or several other substances, which give the slip-catalyst similar characteristics as those in platinum group metals. The slip-catalyst may also comprise an $NO_x$-reducing coating, where the coating may for example comprise Cu- or Fe-Zeolite or vanadium. Zeolite may here be activated with an active metal, such as for example copper (Cu) or iron (Fe).

According to one embodiment of the present invention, the first impact 210 is preceded by a first supply 205 of a first additive into the exhaust stream, upstream of the first device. The first impact 210 here comprises a first reduction of the first amount of nitrogen oxides $NO_{x\_1}$, reaching the first device via a first selective catalytic reduction catalyst $SCR_1$, which is followed by the reduction of nitrogen oxides $NO_x$, and/or oxidation of potential additive in the exhaust stream, via the first slip-catalyst $SC_1$.

As mentioned above, the selective catalytic reduction catalyst $SCR_1$ uses additive at the reduction of nitrogen oxides $NO_x$ in the exhausts. Additive is injected into the exhaust stream resulting from the combustion engine, upstream of the catalyst, and is adsorbed (deposited) in the first selective catalytic reduction catalyst $SCR_1$, so that a redox-reaction may occur between nitrogen oxides $NO_x$ in the exhausts and the additive.

The active control of the first impact may, according to one embodiment of the present invention, comprise a control of a dosage of additive at the first device.

The active control of the first impact 210 may, for example, be based also on a coverage degree/filling degree of additive for the first selective catalytic reduction catalyst $SCR_1$, and/or on a coverage degree for the first slip-catalyst $SC_1$.

The active control of the first impact 210 may, for example, be based also on at least one catalytic characteristic for the first selective catalytic reduction catalyst $SCR_1$, and/or on at least one catalytic characteristic for the first slip-catalyst $SC_1$.

The active control of the first impact 210 may, for example, also be based on a temperature for the first selective catalytic reduction catalyst $T_{SCR1}$, and/or on a temperature for the first slip-catalyst $T_{SC1}$.

The active control of the first impact 210 may, for example, be based also on how much of the first amount of nitrogen oxides $NO_{x_{-1}}$ that reaches the first device, and that may be stored and/or reduced by the first slip-catalyst $SC_1$.

The active control of the first impact 210 may here comprise the first supply 205 of the first additive occurring to such an extent, that a filling degree/coverage degree for the first additive in the first selective catalytic reduction catalyst $SCR_1$ exceeds a value for its maximum filling degree for additive.

Such an active control of the first impact 210 may result in a slip of additive out from the first selective catalytic reduction catalyst $SCR_1$.

According to one embodiment of the present invention, the active control of the first impact 210, for example the control of the supply of additive, is therefore carried out in such a way that the slip of additive emanating from the first selective catalytic reduction catalyst $SCR_1$ may substantially be stored, and/or oxidized, in the first slip-catalyst $SC_1$.

The use of the first slip-catalyst $SC_1$ in the first device means that a larger margin is obtained at the reduction of nitrogen oxides $NO_x$, since a lot of additive may be administered before the reduction with the first selective catalytic reduction catalyst $SCR_1$. To administer so much additive before the first selective catalytic reduction catalyst $SCR_1$ is possible, since the first slip-catalyst $SC_1$ takes care of any potential slip.

Furthermore, tests have shown that the reduction of nitrogen oxides $NO_x$ with the first multifunctional slip-catalyst $SC_1$ in the first device becomes surprisingly efficient. This is a result of a sufficient amount of nitrogen oxides $NO_x$ in the exhaust stream after the first reduction catalyst $SCR_1$ being present at the first slip-catalyst $SC_1$ in the first device, in order for an efficient reduction of nitrogen oxides $NO_x$ to be obtained. In other words, the relatively good availability of nitrogen oxides $NO_x$ at the first slip-catalyst $SC_1$ may be used to achieve a very good performance, and/or a very good utilization, when a multifunctional slip-catalyst $SC_1$ is used in the first catalyst device.

In order to achieve good performance for the reduction of nitrogen oxides via the first selective catalytic reduction catalyst $SCR_1$, a certain high filling degree/coverage degree for additive needs to be achieved in the first selective catalytic reduction catalyst $SCR_1$. The utilization of this high filling degree/coverage degree for additive is thus facilitated through the use of the first slip-catalyst $SC_1$. Accordingly, a very efficient reduction of nitrogen oxides $NO_x$ may be obtained via the first selective catalytic reduction catalyst $SCR_1$, since the filling degree of additive may be kept high.

According to different embodiments of the present invention, the dosage of additive may even be controlled actively in such a way that the dosage results in a slip of additive out from the first selective catalytic reduction catalyst $SCR_1$, as long as this slip of additive may substantially be stored and/or oxidized in the first slip-catalyst $SC_1$.

For prior art solutions, which do not comprise a first slip-catalyst $SC_1$ in the first device, such high filling degrees may not be used because of the risk of a slip, which may substantially deteriorate the function of components arranged downstream in the exhaust treatment system.

According to one embodiment of the present invention, the active control of the first impact 210 is carried out in such a way that the first supply 205 of the first additive is considerably reduced, if a filling degree for the first additive in the first slip-catalyst $SC_1$ exceeds a value for the maximum filling degree for additive in the first slip-catalyst $SC_1$.

After this reduction of supplied additive, the filling degree for additive drops again in the first selective catalytic reduction catalyst $SCR_1$.

For example, such an active control, resulting results in a slip of additive out of the first selective catalytic reduction catalyst $SCR_1$, may be used in connection with a transient temperature gradient for the exhaust stream, a cold start of the combustion engine, and/or a moving off of a vehicle comprising the combustion engine.

According to one embodiment of the present invention, the first device comprises an $NO_x$-storing catalyst NCC, followed downstream by a first dosage device, followed downstream by a first selective catalytic reduction catalyst $SCR_1$, followed downstream by a first slip-catalyst $SC_1$. Here, nitrogen oxides $NO_x$ are thus stored first with the $NO_x$-storing catalyst NCC, following which additive is supplied into the exhaust stream, which additive is used at the first reduction of the first amount of nitrogen oxides $NO_{x_{-1}}$ in the first selective catalytic reduction catalyst $SCR_1$, following which reduction of nitrogen oxides $NO_x$, and/or an oxidation of potential additive in the exhaust stream, is carried out by the slip-catalyst $SC_1$. It should be noted here that the first dosage device 371 here is arranged between the $NO_x$-storing catalyst NCC, and the first selective catalytic reduction catalyst $SCR_1$, so that the additive is therefore supplied within the first device. This differs from most other embodiments described herein, for which the additive is supplied upstream of the first device.

According to one embodiment of the present invention, the first device comprises a first dosage device, followed downstream by a first selective catalytic reduction catalyst $SCR_1$, followed downstream by a first slip-catalyst $SC_1$, followed downstream by an $NO_x$-storing catalyst NCC. Here, additive is thus first supplied to the exhaust stream, which additive is used at the first reduction of the first amount of nitrogen oxides $NO_{x_{-1}}$ in the first selective catalytic reduction catalyst $SCR_1$, following which a reduction of nitrogen oxides $NO_x$, and/or an oxidation of potential additive in the exhaust stream, is carried out by the slip-catalyst $SC_1$, following which nitrogen oxides are stored in the $NO_x$-storing catalyst NCC.

According to one embodiment of the present invention, the first device comprises an $NO_x$-storing catalyst NCC, followed downstream by a first dosage device, followed downstream by a first selective catalytic reduction catalyst $SCR_1$, followed downstream by a first slip-catalyst $SC_1$, followed downstream by an $NO_x$-storing catalyst NCC. Here, nitrogen oxides $NO_x$ are thus stored in the $NO_x$-storing catalyst NCC, following which additive is supplied to the exhaust stream, which additive is used at the first reduction of the first amount of nitrogen oxides $NO_{x_{-1}}$ in the first selective catalytic reduction catalyst $SCR_1$, following which a reduction of nitrogen oxides $NO_x$, and/or an oxidation of potential additive in the exhaust stream is carried out by the slip-catalyst $SC_1$, following which nitrogen oxides are stored in the $NO_x$-storing catalyst NCC. For this embodiment as well, the first dosage device 371 is arranged between the $NO_x$-storing catalyst NCC and the first selective catalytic reduction catalyst $SCR_1$, and thus supplies the additive within the first device.

According to one embodiment of the present invention, the first impact consists of the reduction of nitrogen oxides $NO_x$, and/or oxidation of potential additive in the exhaust stream, supplied by the first slip-catalyst $SC_1$ itself. In other words, here the first device comprises only the first multifunctional slip-catalyst $SC_1$.

According to one embodiment of the present invention, the first impact consists of the storage of nitrogen oxides $NO_x$ through the $NO_x$-storing catalyst NCC. In other words, here the first device comprises only the $NO_x$-storing catalyst NCC.

According to one embodiment of the present invention, the active control of the first impact may comprise a control of the storage of nitrogen oxides $NO_x$ in an $NO_x$-storing catalyst NCC, comprised in the first device. Control of the storage of nitrogen oxides $NO_x$ in the $NO_x$-storing catalyst NCC may be carried out in an applicable manner, for example by way of an active control of the exhaust environment at the $NO_x$-storing catalyst NCC, and/or of the temperature at the $NO_x$-storing catalyst NCC. This control may for example be carried out by way of a control of the combustion engine's function.

According to one embodiment of the present invention, the active control of the first impact 210 is also based on a coverage degree of nitrogen oxides $NO_x$ in the $NO_x$-storing catalyst NCC.

The first amount of nitrogen oxides $NO_{x\_1}$ reaching the first device may, according to one embodiment, correspond to a first ratio $NO_{2\_1}/NO_{x\_1}$, between a first amount of nitrogen dioxide $NO_{2\_1}$ and a first amount of nitrogen oxides $NO_{x\_1}$, reaching the first device. A value $(NO_{2\_1}/NO_{x\_1})_{det}$ may be determined for this first ratio $NO_{2\_1}/NO_{x\_1}$, for example in the form of a measured, modelled and/or predicted value.

The second amount of nitrogen oxides $NO_{x\_2}$ reaching the second device may, according to one embodiment, corresponds to a second ratio $NO_{2\_2}/NO_{x\_2}$, between a second amount of nitrogen dioxide $NO_{2\_2}$ and a second amount of nitrogen oxides $NO_{x\_2}$, reaching the second device. A value $(NO_{2\_2}/NO_{x\_2})_{det}$ may be determined for the second ratio $NO_{2\_2}/NO_{x\_2}$, for example in the form of a measured, modelled and/or predicted value.

According to one embodiment of the present invention, the active control of the first impact 210 is also based on the determined value $(NO_{2\_2}/NO_{x\_2})_{det}$ for the second ratio, between the second amount of nitrogen dioxide $NO_{2\_2}$ and the second amount of nitrogen oxides $NO_{x\_2}$, reaching the second device. This active control of the first impact 210 may here achieve a reduction of a value $NO_{2\_2}/NO_{x\_2}$ for this second ratio, since the second amount of nitrogen oxides $NO_{x\_2}$ reaching the second device is increased. This may be achieved by carrying out the active control of the first impact in such a way that the first impact comprises a reduced reduction of the first amount of nitrogen oxides $NO_{x\_1}$ in the first device. Thus, an increase of the second amount of nitrogen oxides $NO_{x\_2}$ is achieved.

The active control of the first impact may be carried out by controlling the dosage of a first supply 205 of a first additive in the exhaust stream, upstream of the first device. The active control may be based on the determined value $(NO_{2\_2}/NO_{x\_2})_{det}$ for the second ratio, so that a high determined value $(NO_{2\_2}/NO_{x\_2})_{det}$ for the second ratio results in supply of less additive, than what a low determined value $(NO_{2\_2}/NO_{x\_2})_{det}$ for the second ratio results in.

This may also be described as the first supply 205 of additive decreasing, if the determined value $(NO_{2\_2}/NO_{x\_2})_{det}$ for the second ratio is greater than an upper threshold value $(NO_{2\_2}/NO_{x\_2})_{threshold\_high}$, $(NO_{2\_2}/NO_{x\_2})_{det}>(NO_{2\_2}/NO_{x\_2})_{threshold\_high}$.

This upper threshold value $(NO_{2\_2}/NO_{x\_2})_{threshold\_high}$ may have a value that depends on catalytic characteristics for the first device, and/or catalytic characteristics for the second device. The upper threshold value $(NO_{2\_2}/NO_{x\_2})_{threshold\_high}$ may also have a value which depends on a catalyst type for the first device, and/or for the second device. The upper threshold value $(NO_{2\_2}/NO_{x\_2})_{threshold\_high}$ may also have a value which depends on a temperature interval, within which the first and/or second device is active. The upper threshold value $(NO_{2\_2}/NO_{x\_2})_{threshold\_high}$ may also have a value, which depends on a coverage degree of additive for the first and/or the second device. The upper threshold value $(NO_{2\_2}/NO_{x\_2})_{threshold\_high}$ may also have a value, which depends on a coverage degree of additive for the first and/or the second device. The upper threshold value $(NO_{2\_2}/NO_{x\_2})_{threshold\_high}$ may also have a value, which depends on a temperature at the first and/or the second device.

The upper threshold value $(NO_{2\_2}/NO_{x\_2})_{threshold\_high}$ may, for example, have a value within the interval $(NO_{2\_2}/NO_{x\_2})_{threshold\_high}>50\%$, preferably within the interval $50\%>(NO_{2\_2}/NO_{x\_2})_{threshold\_high}\geq 85\%$, and more preferably within the interval $60\%>(NO_{2\_2}/NO_{x\_2})_{threshold\_high}\geq 75\%$.

According to another embodiment of the present invention, the active control of the first impact 210 achieves an increase of a value $NO_{2\_2}/NO_{x\_2}$ for the second ratio. This increase is achieved, since the second amount of nitrogen oxides $NO_{x\_2}$ is reduced. The increase of the value $NO_{2\_2}/NO_{x\_2}$ for the second ratio may here be achieved by way of the active control of the first impact being carried out in such a way that the first impact comprises an increased reduction of the first amount of nitrogen oxides $NO_{x\_1}$ in the first device. The increased reduction results in a reduction of the second amount of nitrogen oxides $NO_{x\_2}$.

As described above, the first impact 210 may be preceded by a first supply 205 of a first additive into the exhaust stream, upstream of the first device. This first supply 205 may, according to one embodiment, be based on the determined value $(NO_{2\_2}/NO_{x\_2})_{det}$ for the second ratio, so that a low determined value $(NO_{2\_2}/NO_{x\_2})_{det}$ thus results in supply of more additive, than what a high determined value $(NO_{2\_2}/NO_{x\_2})_{det}$ results in.

This may also be expressed as the first supply 205 being increased, if the determined value $(NO_{2\_2}/NO_{x\_2})_{det}$ for the second ratio is less than, or equal to, a lower threshold value $(NO_{2\_2}/NO_{x\_2})_{threshold\_low}$, $(NO_{2\_2}/NO_{x\_2})_{det}\leq(NO_{2\_2}/NO_{x\_2})_{low}$.

This lower threshold value $(NO_{2\_2}/NO_{x\_2})_{threshold\_low}$ may have a value, which depends on catalytic characteristics for the first and/or second device. The lower threshold value $(NO_{2\_2}/NO_{x\_2})_{threshold\_low}$ may also have a value, which depends on a catalyst type for the first and/or the second device. The lower threshold value $(NO_{2\_2}/NO_{x\_2})_{threshold\_low}$ may also have a value, which depends on a temperature interval, within which the first and/or second device is active. The lower threshold value $(NO_{2\_2}/NO_{x\_2})_{threshold\_low}$ may also have a value, which depends on a coverage degree of additive for the first and/or the second device. The lower threshold value $(NO_{2\_2}/NO_{x\_2})_{threshold\_low}$ may also have a value, which depends on a coverage degree of additive for the first and/or the second device. The lower threshold value $(NO_{2\_2}/NO_{x\_2})_{threshold\_low}$ may also have a value, which depends on a temperature at the first and/or second device.

The lower threshold value $(NO_{2\_2}/NO_{x\_2})_{threshold\_low}$ may, for example, have a value within the interval $(NO_{2\_2}/NO_{x\_2})_{threshold\_low}<50\%$, preferably within the interval $10\%\leq(NO_{2\_2}/NO_{x\_2})_{threshold\_low}\leq 40\%$, and more preferably within the interval $20\%\leq(NO_{2\_2}/NO_{x\_2})_{threshold\_low}\leq 60\%$.

As mentioned above, the second amount of nitrogen oxides $NO_{x\_2}$ corresponds to a second ratio $NO_{2\_2}/NO_{x\_2}$, between a second amount of nitrogen dioxide $NO_{2\_2}$ and a second amount of nitrogen oxides $NO_{x\_2}$, reaching the second device.

According to one embodiment of the present invention, for which at least one component with oxidizing coating is arranged upstream of the first device, the active control of the first impact 210 comprises a control of the first supply 205 of the first additive. The first supply 205 of the first additive is here controlled based on a determined value $(NO_{2\_2}/NO_{x\_2})_{det}$ for the second ratio, so that a fast reduction may be used in the second device at the first impact. Thus, the first supply 205 may be controlled in such a way that the reduction in the second device occurs, to as large extent as possible, via reaction paths over both nitrogen oxides NO and nitrogen dioxide $NO_2$. In fast reduction the reaction uses equal parts of nitrogen monoxide NO and nitrogen dioxide $NO_2$, which means that an optimal value for the molar ratio $NO_2/NO_x$ is nearly 50%.

As mentioned above, the first amount of nitrogen oxides $NO_{x\_1}$ corresponds to a first ratio $NO_{2\_1}/NO_{x\_1}$, between a first amount of nitrogen dioxide $NO_{2\_1}$ and a first amount of nitrogen oxides $NO_{x\_1}$, reaching the first device.

According to one embodiment of the present invention, for which at least one component with oxidizing coating is arranged upstream of the first device, the active control of the first impact 210 comprises a control of the first supply 205 of the first additive. The first supply 205 of the first additive is here controlled based on a determined value $(NO_{2\_1}/NO_{x\_1})_{det}$ for the first ratio, so that a fast reduction may be used in the first device at the first impact. Thus, the first supply 205 may thus be controlled in such a way that the reduction in the first device occurs, to as great an extent as possible, via reaction paths over both nitrogen oxides NO and nitrogen dioxide $NO_2$. In fast reduction the reaction uses equal parts of nitrogen monoxide NO and nitrogen dioxide $NO_2$, which means that an optimal value for the molar ratio $NO_2/NO_x$ is nearly 50%.

The above mentioned determined value $(NO_{2\_1}/NO_{x\_1})_{det}$ for the first ratio, and/or he above determined value $(NO_{2\_2}/NO_{x\_2})_{det}$ for the second ratio may consist of a measured value, a modelled value and/or a predicted value.

A person skilled in the art will realize that a method for treatment of an exhaust stream according to the present invention may also be implemented in a computer program, which when executed in a computer will cause the computer to execute the method. The computer program usually consists of a part of a computer program product 403, where the computer program product comprises a suitable non-volatile/permanent/persistent/durable digital storage medium on which the computer program is stored. Said non-volatile/permanent/persistent/durable computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 4:
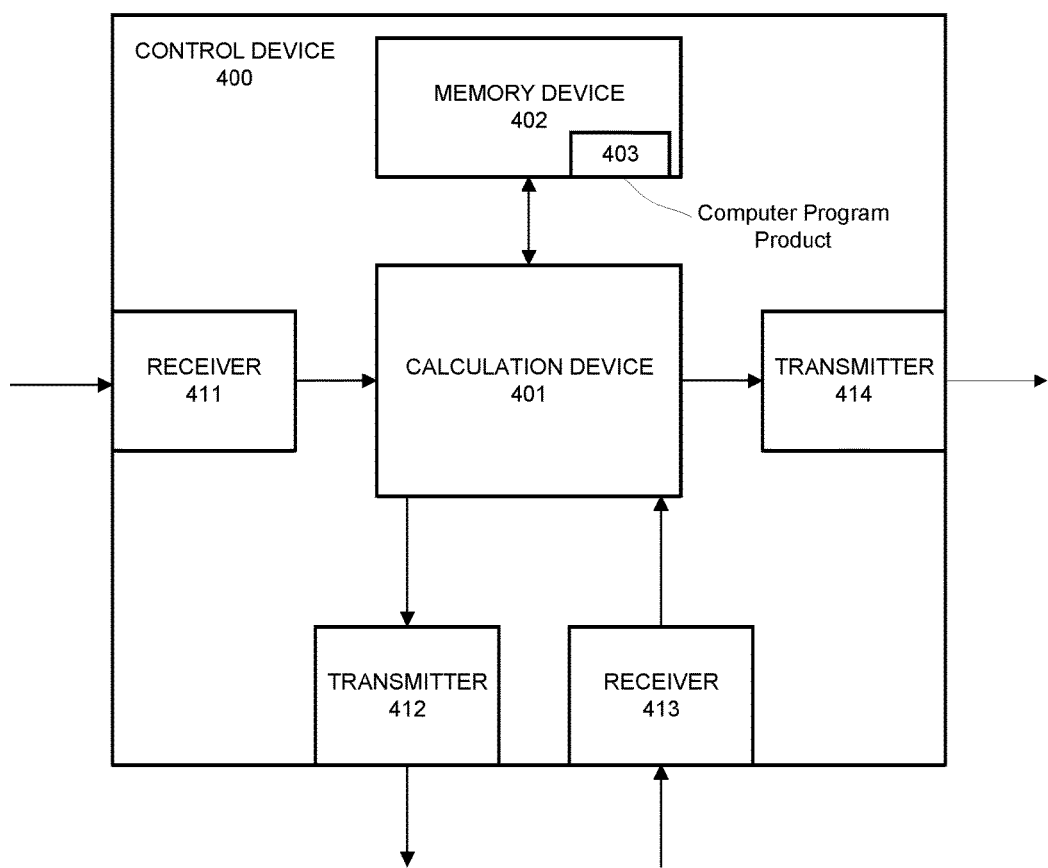
FIG. 4 shows a control device, in which a method according to the present invention may be implemented.

FIG. 4 schematically shows a control device 400. The control device 400 comprises a calculation device 401, which may consist of essentially a suitable type of processor or microcomputer, e.g. a circuit for digital signal processing (Digital Signal Processor, DSP), or a circuit with a predetermined specific function (Application Specific Integrated Circuit, ASIC). The calculation device 401 is connected to a memory unit 402 installed in the control device 400, providing the calculation device 401 with e.g. the stored program code, and/or the stored data which the calculation device 401 needs in order to be able to carry out calculations.

The calculation device 401 is also set up to store interim or final results of calculations in the memory device 402.

Further, the control device 400 is equipped with devices 411, 412, 413, 414 for receiving and sending of input and output signals. These input and output signals may contain wave shapes, pulses or other attributes, which may be detected as information by the devices 411, 413 for the receipt of input signals and may be converted into signals that may be processed by the calculation device 401. These signals are then provided to the calculation device 401. The devices 412, 414 for sending output signals are arranged to convert the calculation result from the calculation unit 401 into output signals for transfer to other parts of the vehicle's control system, and/or the component(s) for which the signals are intended, for example the first and/or second dosage devices.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection.

A person skilled in the art will realize that the above-mentioned computer may consist of the calculation device 401, and that the above-mentioned memory may consist of the memory device 402.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown thus often comprise significantly more control devices than what is shown in FIG. 4, which is well known to a person skilled in the art within the technology area.

The present invention, in the embodiment shown, is implemented in the control device 400. The invention may, however, also be implemented wholly or partly in one or several other control devices already existing in the vehicle, or in a control device dedicated to the present invention.

Here, and in this document, devices are often described as being arranged to carry out steps in the method according to the invention. This also comprises that the devices are adapted and/or set up to carry out these method steps.

Figure 3:
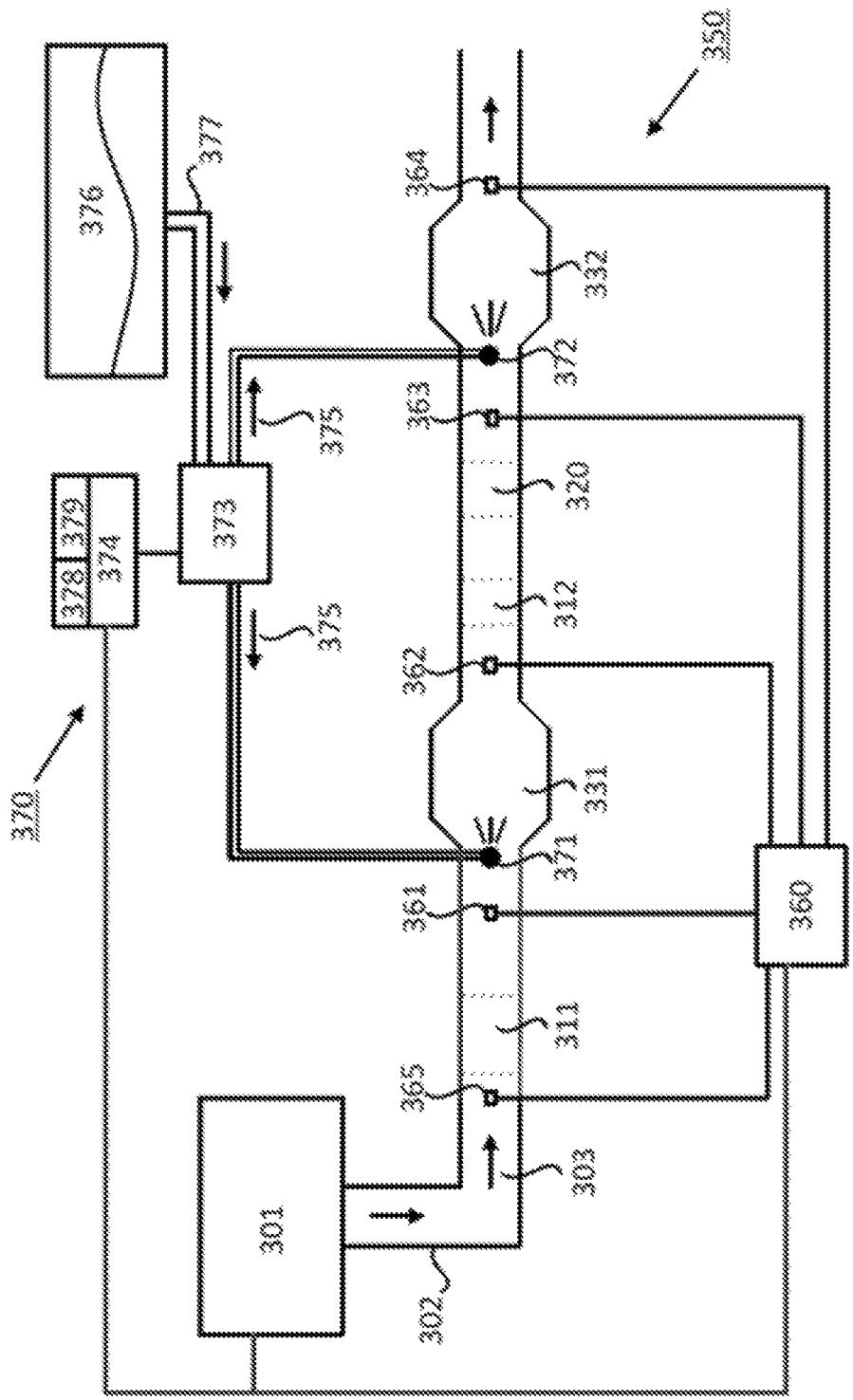
FIG. 3 shows an example of an exhaust treatment system according to the present invention.

FIG. 3 schematically shows an exhaust treatment system 350 according to one aspect of the present invention, which is connected via an exhaust conduit 302 to a combustion engine 301. Exhausts generated at combustion in the engine 301, that is to say the exhaust stream 303 (indicated with arrows), are led to a first device 331, arranged in the exhaust treatment system 350, to provide a first impact 210 on a first amount of nitrogen oxides $NO_{x\_1}$ reaching the first device 331.

According to one embodiment of the present invention, the exhaust stream 303 is led past a first dosage device 371, arranged in the exhaust treatment system 350 to provide a first supply 205 of a first additive into the exhaust stream 303, before it reaches the first device 331. For this embodiment, the first additive is used, which was supplied to the exhaust stream 303 during the first supply 205 at the first impact through the first device 331.

According to one embodiment of the invention, a first hydrolysis catalyst, which may consist of substantially any suitable hydrolysis coating, and/or a first mixer, may be arranged in connection with the first dosage device 371. The first hydrolysis catalyst, and/or the first mixer, are in this case used to increase the speed of the decomposition of urea into ammonia, and/or to mix the additive with the emissions, and/or to vaporize the additive.

According to the present invention, the first device 331 comprises at least one $NO_x$-storing catalyst NCC, and/or a first slip-catalyst $SC_1$. The $NO_x$-storing catalyst NCC is here arranged to carry out a storage of nitrogen oxides $NO_x$. The first slip-catalyst $SC_1$ may be multifunctional, and may carry out a reduction of nitrogen oxides $NO_x$, and/or an oxidation of potential additive in the exhaust stream 303.

This first impact 210 via the first device 331 may, according to the present invention, be controlled actively based on at least the first amount of nitrogen oxides $NO_{x\_1}$ reaching the first device 331. This active control may, for example, be obtained via a control of the first dosage, via a control of the temperature at the first device 331, and/or via a control of an exhaust environment at the first device 331 in the manner described above.

The exhaust treatment system 350 also comprises a second device 332, arranged to provide a second impact 240 on a second amount of nitrogen oxides $NO_{x\_2}$ reaching the second device 332.

According to one embodiment of the present invention, the exhaust treatment system 350 also comprises a second dosage device 372, arranged downstream of the first device 331, that is to say upstream of the second device 331, to provide a second supply 215 of a second additive to the exhaust stream 303. For this second embodiment, the second additive is used, which was supplied to the exhaust stream by the second dosage device 372 during the second impact in the second device 332.

The exhaust treatment system 350 also comprises, according to one embodiment, at least one dosage control device 374, arranged to control at least one of the first supply 205 and the second supply 215.

In other words, the dosage control device 374 controls one or several of the first dosage device 371 and the second dosage device 372, and/or pumps or similar devices, which supply these dosage devices 371, 372 with additive. According to one embodiment, this dosage is controlled in such a way that a sufficient amount of additive is supplied into the exhaust stream via the first dosage device 371, in order to achieve the active control of the first impact.

Through the use of the exhaust treatment system 350 according to the present invention, the active control of the level of nitrogen dioxide $NO_2$ may be used to increase or reduce the level of nitrogen dioxide $NO_2$ in those driving modes, for which this is necessary. Thus, an exhaust treatment system may be created, which requires less precious metal and accordingly also is cheaper to manufacture.

Through the use of the control according to the present invention, a fuel consumption neutral manner of increasing the reaction speed over one or several reduction catalysts in the exhaust treatment system is obtained, since the control may be implemented so that as large a fraction as possible of the reduction occurs via reaction paths over both nitrogen oxide NO and nitrogen dioxide $NO_2$.

The load on the reduction catalysts increases, in some embodiments, the increased level for nitrogen oxides $NO_x$. However, the catalysts that carry out the reduction of nitrogen oxides $NO_x$ will have good conditions for coping with this load, since the increase occurs primarily at an approximate exhaust temperature of around 260-340° C., whereat the catalysts have rather a good performance.

By using the present invention, a more efficient and predictable reduction of nitrogen oxides $NO_x$ is obtained. This means that, for example, the control of the dosage of additive will result in more reliable results.

According to one embodiment of the present invention, the exhaust treatment system may comprise a first oxidation catalyst $DOC_1$ 311, comprising a substrate with oxidizing coating, arranged upstream of the first dosage device 371, and/or a second oxidation catalyst $DOC_2$ 312, comprising a substrate with oxidizing coating, arranged downstream of the first device 331. The first oxidation catalyst $DOC_1$ 311, and/or the second oxidation catalyst $DOC_2$ 312, are in that case arranged to oxidize nitrogen compounds, carbon compounds, and/or hydrocarbon compounds, in the exhaust stream 303 in the exhaust treatment system 350. At the oxidation in the first oxidation catalyst $DOC_1$ 311, a part of the nitrogen monoxides NO in the exhaust stream 303 is oxidized into nitrogen dioxide $NO_2$.

According to one embodiment of the present invention, the exhaust system 350 comprises a particulate filter 320, downstream of the first device, or downstream of the second oxidation catalyst $DOC_2$ 312, if this is comprised in the system. The particulate filter 320 is arranged to catch and oxidize soot particles. The exhaust stream 303 is here led through the filter structure of the particulate filter, where soot particles are caught in the filter structure from the exhaust stream 303 passing through, and are stored and oxidized in the particulate filter.

The first oxidation catalyst $DOC_1$ 311, and/or the second oxidation catalyst $DOC_2$ 312, are at least partly coated with a catalytic oxidizing coating, where such oxidizing coating may comprise at least one precious metal, for example platinum.

According to one embodiment of the present invention, the particulate filter 320 consists of a diesel particulate filter (DPF). This filter is thus used to catch, store and oxidize soot particles from the exhaust stream 303.

According to another embodiment of the present invention, the particulate filter 320 consists of a particulate filter which at least partly is coated with a catalytic oxidizing coating, where such oxidizing coating may comprise at least one precious metal. That is to say, the particulate filter 320 may at least partly be coated with one or several precious metals, for example platinum. The particulate filter cDPF, comprising the oxidizing coating, may result in more stable conditions for the nitrogen dioxide level $NO_2$ at the second device 332. Additionally, the use of the particulate filter cDPF, comprising the oxidizing coating, means that the value for the ratio $NO_2/NO_x$, that is to say the level of $NO_2$, may be controlled. Since the particulate filter cDPF with the oxidizing coating is used, according to one embodiment the second oxidation catalyst $DOC_2$ 312 is not needed in the system.

Figure 5:
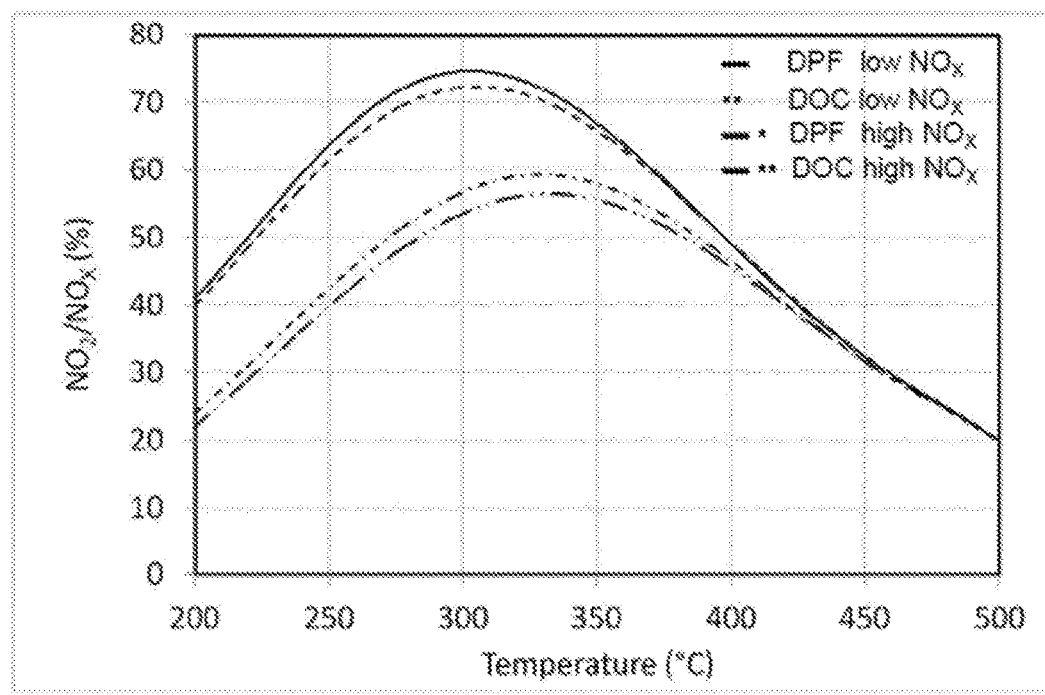
FIG. 5 shows an example of an effect of an increased $NO_x^{-level}$.

By actively controlling the level of nitrogen oxides $NO_x$ reaching the at least one substrate with oxidizing coating, which may for example be comprised in a first $DOC_1$, in a second $DOC_2$, and/or in a cDPF, an adjustment of the fraction of nitrogen dioxide $NO_2$ reaching a second selective catalytic reduction catalyst arranged downstream, may be obtained. This means that the second selective catalytic reduction catalyst provides a turnover which is more predictable. For example, an increase of the amount of nitrogen oxides $NO_x$ produced by the engine may be desirable in those cases, where it is expected that there is a risk of the fraction of nitrogen dioxides $NO_2$ exceeding a maximum desired value. As an example, FIG. 5 shows an effect obtained for the fraction of nitrogen dioxide $NO_2$ at an increase of the level for nitrogen oxides $NO_x$ from a low value, for example 300 ppm, to a higher value, for example 1400 ppm. As described by the figure, the value for the ratio $NO_2/NO_x$ at DOC, and/or DPF, drops from approximately 70% to between 50% and 60%, when the level for nitrogen oxides $NO_x$ increases from 300 to 1400 ppm. This reduction of the value for the ratio $NO_2/NO_x$ considerably improves the conditions for "fast SCR" as described above.

The load on the first, and/or second devices, increases as a result of the increased level for nitrogen oxides $NO_x$. Since the increase occurs primarily at an approximate exhaust temperature of around 260-340° C., at which there is a risk of the at least one oxidizing substrate producing $NO_2/NO_x$>50%, the first 331, and/or second 332 devices, will have good conditions for coping with this load. At these temperatures, that is to say at 260-340° C., the first 331 and/or the devices 332, depending on the respective specifications, have rather a good performance. Additionally, there are rather good conditions for vaporization of reductant at these temperatures.

According to one embodiment of the present invention, the first, and/or the second, additive comprises ammonia $NH_3$ or urea, from which ammonia may be generated//formed/released. This additive may for example consist of AdBlue. The first and the second additive may be of the same type, or may be of different types.

According to one embodiment of the present invention, the exhaust treatment system 350 comprises a system 370 for supply of additive, which comprises at least one pump 373, arranged to supply the first 371 and the second 372 dosage devices with additive, that is to say for example ammonia or urea.

One example of such a system 370 for supply of additive is s schematically shown in FIG. 3, where the system comprises the first dosage device 371 and the second dosage device 372, which are arranged upstream of the first device 331, and upstream of the second device 332, respectively. The first and second dosage devices 371, 372, often consisting of dosage nozzles which administer additive to, and mix such additive with, the exhaust stream 303, are supplied with additive by the at least one pump 373, via conduits 375 for additive. The at least one pump 373 obtains additive from one or several tanks 376 for additive, via one or several conduits 377 between the tank/tanks 376, and the at least one pump 373. It should be realized that the additive may be in liquid form and/or gaseous form. Where the additive is in liquid form the pump 373 is a liquid pump, and the one or several tanks 376 are liquid tanks. Where the additive is in gaseous form, the pump 373 is a gas pump, and the one or several tanks 376 are gas tanks. If both gaseous and liquid additives are used, several tanks and pumps are arranged, wherein at least one tank and one pump are set up to supply liquid additive and at least one tank and one pump are set up to supply gaseous additive.

According to one embodiment of the invention, the at least one pump 373 comprises a joint pump, which feeds both the first 371 and the second 372 dosage device with the first and the second additive, respectively. According to another embodiment of the invention, the at least one pump comprises a first and a second pump, which feed the first 371 and the second 372 dosage device, respectively, with the first and the second additive, respectively. The specific function of the additive system 370 is well described in prior art technology, and the exact method for the injection of additive is therefore not described in any further detail herein. Generally, however, the temperature at the point of injection/SCR-catalyst should be above a lower threshold temperature to avoid precipitates and formation of unwanted by-products, such as ammonium nitrate $NH_4NO_3$. An example of a value for such a lower threshold temperature may be approximately 200° C. According to one embodiment of the invention, the system 370 for supply of additive comprises a dosage control device 374, arranged to control the at least one pump 373, so that the additive is supplied to the exhaust stream. The dosage control device 374 comprises, according to one embodiment, a first pump control device 378 arranged to control the at least one pump 373, in such a manner that a first dosage of the first additive is supplied to the exhaust stream 303, via the first dosage device 371. The dosage control device 374 also comprises a second pump control device 379, arranged to control the at least one pump 373, so that a second dosage of the second additive is supplied to the exhaust stream 303 via the second dosage device 372.

The first and second additives usually consist of the same type of additive, for example urea. However, according to one embodiment of the present invention, the first additive and the second additive may be of different types, for example urea and ammonia, which means that the dosage to each one of the first 331 and second 332 devices, and accordingly also the function for each of the first 331 and second 332 devices, may be optimized also with respect to the type of additive. If different types of additive are used, the tank 376 comprises several sub-tanks, which contain the different respective types of additive. One or several pumps 373 may be used to supply the different types of additive to the first dosage device 371 and the second dosage device 372. As mentioned above, the one or several tanks and the one or several pumps, are adapted according to the state of the additive, that is to say according to whether the additive is gaseous or liquid.

The one or several pumps 373 are thus controlled by a dosage control device 374, which generates control signals for control of supply of additive so that a desired amount is injected in the exhaust stream 303 with the help of the first 371 and the second 372 dosage device, respectively, upstream of the first 331 and the second 332 device, respectively. In more detail, the first pump control device 378 is arranged to control either a joint pump, or a pump dedicated to the first dosage device 371, so that the first dosage is controlled to be supplied to the exhaust stream 303 via the first dosage device 371. The second pump control device 379 is arranged to control either a joint pump, or a pump dedicated to the second dosage device 372, so that the second dosage is controlled to be supplied to the exhaust stream 303 via the second dosage device 372.

The at least one control device 374 is drawn in the figure comprising separately marked units 378, 379. These units 378, 379 may also be logically separate, but physically implemented in the same unit, or may be both logically and physically jointly arranged/implemented. For example, these units 378, 379 may correspond to different groups of instructions, for example in the form of program code, which is fed into, and used by a processor when the respective unit is active/used to implement the respective method steps.

The exhaust treatment system 350 may also be equipped with one or several sensors, such as one or several $NO_x$—, $NO_2$— and/or temperature sensors 361, 362, 363, 364, 365 arranged, for example, upstream of an oxidation catalyst 311, potentially arranged upstream of the first device, at the inlet to the first device 331, at the outlet from the first device 331, at the inlet to the second device 332, and/or at the outlet from the second device 332, for determination of nitrogen oxides, nitrogen dioxide and/or temperatures in the exhaust treatment system.

The control device 360 may be arranged to provide control signals, and/or signals corresponding to measurements carried out by the one or several $NO_x$—, $NO_2$— and/or the temperature sensors 361, 362, 363, 364, 365, to at least one dosage device 374. The at least one dosage control device 374 thereafter bases the control of supplying dosage substance on such control signals, and/or measurement signals, so that the above mentioned active control of the first impact is obtained.

The control device 360 may also be arranged to provide control signals, and/or signals corresponding to measurements carried out by the one or several $NO_x$—, $NO_2$— and/or the temperature sensors 361, 362, 363, 364, to the combustion engine 301 and/or an engine control device. The combustion engine 301, and/or the engine control device, thereafter base the control of the engine on these control signals, and/or measurement signals, so that the above mentioned active control of the first impact is obtained through a control of the temperature, and/or the exhaust environment.

The method according to the present invention may be implemented in substantially all exhaust treatment systems comprising the above described first device 331, the above described second device 332, and the active control of the first impact. Each of the first device 331 and the second device 332 may be arranged in a number of different ways, and have a number of different characteristics/functions, as described in the examples below.

According to different embodiments of the present invention, the first device 331 may comprise one from among the group of:
- a first selective catalytic reduction catalyst $SCR_1$, followed downstream by a first slip-catalyst $SC_1$, wherein the first slip-catalyst $SC_1$ is arranged to oxidize a residue of additive, and/or to assist the first selective catalytic reduction catalyst $SCR_1$ with an additional reduction of nitrogen oxides $NO_x$ in the exhaust stream 303;
- a first slip-catalyst $SC_1$, followed downstream by a first selective catalytic reduction catalyst $SCR_1$, wherein the first slip-catalyst $SC_1$ is arranged to oxidize additive, and/or to assist the first selective catalytic reduction catalyst $SCR_1$ with reduction of nitrogen oxides $NO_x$ in the exhaust stream 303;
- a first slip-catalyst $SC_1$, followed downstream by a first selective catalytic reduction catalyst $SCR_1$, followed downstream by an additional first slip-catalyst $SC_{1b}$, wherein the first slip-catalyst $SC_1$, and the additional first slip-catalyst $SC_{1b}$ are arranged to oxidize additive, and/or to assist the first selective catalytic reduction catalyst $SCR_1$ with a reduction of nitrogen oxides $NO_x$ in the exhaust stream 303;
- a first slip-catalyst $SC_1$, wherein the first slip-catalyst $SC_1$ is arranged to oxidize additive, and/or for reduction of nitrogen oxides $NO_x$ in the exhaust stream 303;
- a first slip-catalyst $SC_1$, followed downstream by a first selective catalytic reduction catalyst $SCR_1$, combined with a purely oxidizing coating in its outlet part, wherein the first slip-catalyst $SC_1$ is arranged to oxidize additive, and/or to assist the first selective catalytic reduction catalyst $SCR_1$, combined with a purely oxidizing coating in its outlet part, with an additional reduction of nitrogen oxides $NO_x$ in the exhaust stream 303;
- a $NO_x$-storing catalyst NCC, which carries out a storage of nitrogen oxides $NO_x$;
- a first selective catalytic reduction catalyst $SCR_1$, followed downstream by a first slip-catalyst $SC_1$, followed downstream by a $NO_x$-storing catalyst (NCC), wherein the first slip-catalyst $SC_1$ is arranged to oxidize additive, and/or for reduction of nitrogen oxides $NO_x$ in the exhaust stream 303, and wherein the $NO_x$-storing catalyst carries out a storage of nitrogen oxides $NO_x$;
- a $NO_x$-storing catalyst NCC, followed downstream by a first dosage device 371, followed downstream by a first selective catalytic reduction catalyst $SCR_1$, followed downstream by a first slip-catalyst $SC_1$, wherein the first slip-catalyst $SC_1$ is arranged to oxidize additive, and/or for reduction of nitrogen oxides $NO_x$ in the exhaust stream 303, and where the $NO_x$-storing catalyst carries out a storage of nitrogen oxides $NO_x$; and
- a $NO_x$-storing catalyst NCC, followed downstream by a first dosage device 371, followed downstream by a first selective catalytic reduction catalyst $SCR_1$, followed downstream by a first slip-catalyst $SC_1$, followed downstream by an additional $NO_x$-storing catalyst $NCC_b$, wherein the first slip-catalyst $SC_1$ is arranged to oxidize additive, and/or for reduction of nitrogen oxides $NO_x$ in the exhaust stream 303, and where the $NO_x$-storing catalyst NCC, and the additional NOx-storing catalyst $NCC_b$, carry out a storage of nitrogen oxides $NO_x$.

Some of these embodiments are exemplified below.

According to one embodiment of the present invention, the first device 331 comprises an $NO_x$-storing catalyst NCC, followed downstream by a first dosage device 371, followed downstream by a first selective catalytic reduction catalyst $SCR_1$, followed downstream by a first slip-catalyst $SC_1$. Here, nitrogen oxides $NO_x$ are thus stored first through the $NO_x$-storing catalyst NCC, following which additive is supplied to the exhaust stream, which additive is used at the first reduction of the first amount of nitrogen oxides $NO_{x\_1}$ in the first selective catalytic reduction catalyst $SCR_1$, following which reduction of nitrogen oxides $NO_x$, and/or an oxidation of potential additive in the exhaust stream, is carried out by the slip-catalyst $SC_1$. It should be noted here that the first dosage device 371 here is arranged between the $NO_x$-storing catalyst NCC, and the first selective catalytic reduction catalyst $SCR_1$, so that the additive is thus supplied within the first device 331. This is different to most other embodiments described herein, in which the additive is supplied upstream of the first device.

According to one embodiment of the present invention, the exhaust system comprises a first dosage device 371, followed downstream by the first device 331, comprising a first selective catalytic reduction catalyst $SCR_1$, followed downstream by a first slip-catalyst $SC_1$, followed downstream by an $NO_x$-storing catalyst NCC. Here, additive is thus first supplied to the exhaust stream, which additive is used at the first reduction of the first amount of nitrogen oxides $NO_{x\_1}$ in the first selective catalytic reduction catalyst $SCR_1$, following which a reduction of nitrogen oxides $NO_x$, and/or an oxidation of potential additive in the exhaust stream is carried out by the slip-catalyst $SC_1$, following which nitrogen oxides are stored in the $NO_x$-storing catalyst NCC.

According to one embodiment of the present invention, the first device comprises an $NO_x$-storing catalyst NCC, followed downstream by a first dosage device 371, followed downstream by a first selective catalytic reduction catalyst $SCR_1$, followed downstream by a first slip-catalyst $SC_1$, followed downstream by an $NO_x$-storing catalyst NCC. Here, nitrogen oxides $NO_x$ are thus stored in the $NO_x$-storing catalyst NCC, following which additive is supplied to the exhaust stream, which additive is used at the first reduction of the first amount of nitrogen oxides $NO_{x\_1}$ in the first selective catalytic reduction catalyst $SCR_1$, following which a reduction of nitrogen oxides $NO_x$, and/or an oxidation of potential additive in the exhaust stream is carried out by the slip-catalyst $SC_1$, following which nitrogen oxides are stored in the $NO_x$-storing catalyst NCC. For this embodiment as well, the first dosage device 371 is arranged between the $NO_x$-storing catalyst NCC, and the first selective catalytic reduction catalyst $SCR_1$, and thus supplies the additive within the first device.

According to one embodiment of the present invention, the first impact consists of the reduction of nitrogen oxides $NO_x$, and/or oxidation of potential additive in the exhaust stream, supplied by the first slip-catalyst $SC_1$ itself. In other words, here the first device 331 only comprises the first multifunctional slip-catalyst $SC_1$.

According to one embodiment of the present invention, the first impact consists of the storage of nitrogen oxides $NO_x$ with the $NO_x$-storing catalyst NCC. In other words, here the first device 331 only comprises the $NO_x$-storing catalyst NCC.

According to one embodiment of the present invention, the active control of the first impact may comprise a control of the storage of nitrogen oxides $NO_x$ in an $NO_x$-storing catalyst NCC, comprised in the first device 331. Control of the storage of nitrogen oxides $NO_x$ in the $NO_x$-storing catalyst NCC may be carried out in an applicable manner, for example by way of an active control of the exhaust environment at the $NO_x$-storing catalyst NCC, and/or of the temperature at the $NO_x$-storing catalyst NCC. This control may for example be carried out through a control of the combustion engine's function 301, by the control device 360 directly, or via an engine control device.

According to different embodiments of the present invention, the second device 332 comprises one from among the group of:
 a second selective catalytic reduction catalyst $SCR_2$; and
 a second selective catalytic reduction catalyst $SCR_2$, followed downstream by a second slip-catalyst $SC_2$, wherein the second slip-catalyst $SC_2$ is arranged to oxidize a residue of additive, and/or to assist the second selective catalytic reduction catalyst $SCR_2$ with an additional reduction of nitrogen oxides $NO_x$ in the exhaust stream 303.

In this document, a selective catalytic reduction catalyst SCR means a traditional SCR-catalyst (Selective Catalytic Reduction). SCR catalysts usually use an additive, often ammonia $NH_3$, or a composition from which ammonia may be generated/formed, which is used for the reduction of nitrogen oxides $NO_x$ in the exhausts. The additive is injected into the exhaust stream resulting from the combustion engine upstream of the catalyst, as described above. The additive added to the catalyst is adsorbed (stored) in the catalyst, in the form of ammonia $NH_3$, so that a redox-reaction may occur between nitrogen oxides $NO_x$ in the exhausts and ammonia $NH_3$, available via the additive.

Slip-catalyst SC as used in this document, means a catalyst which is arranged to oxidize additive, and/or to assist a selective catalytic reduction catalyst SCR with a reduction of nitrogen oxides $NO_x$ in said exhaust stream 303. The use of a first slip-catalyst $SC_1$ in the first device 331 facilitates a greater load, and therefore a better use, of the first selective catalytic reduction catalyst $SCR_1$, and also facilitates a reduction of the starting temperature (the "light off"-temperature) for the $NO_x$-reduction.

To comprise a slip-catalyst $SC_1$, and/or the additional first slip-catalyst $SC_{1b}$, in the first device 331, which slip-catalysts are multifunctional, and accordingly reduce nitrogen oxides $NO_x$ through the use of the additive, and which also oxidize the additive, entails a number of advantages for the exhaust treatment system. The first slip-catalyst $SC_1$, and/or the additional first slip-catalyst $SC_{1b}$, may here be used in symbiosis with the first reduction catalyst $SCR_1$, so that the activity of the first slip-catalyst $SC_1$, and/or the additional first slip-catalyst $SC_{1b}$, with respect to the reduction of nitrogen oxides $NO_x$, and oxidation of residues of additive, as well as the slip-catalysts' $SC_1$, $SC_{1b}$ deposit characteristics for additive, constitute a complement to the function of the first reduction catalyst $SCR_1$. The combination of these characteristics for the first device 331, comprising the first reduction catalyst $SCR_1$, the first slip-catalyst $SC_1$, and/or the additional first slip-catalyst $SC_{1b}$, means that a higher conversion level may be obtained over the first device 331. Additionally, the use of the first slip-catalyst $SC_1$, and/or of the additional first slip-catalyst $SC_{1b}$, in the first device 331 result results in conditions making it possible to avoid a non-selective oxidation of reductant occurring in components placed downstream of the first device 331 in the exhaust treatment system, which may potentially comprise platinum metals.

Furthermore, tests have shown that the reduction of nitrogen oxides $NO_x$ with the first multifunctional slip-catalyst $SC_1$, and/or the additional first slip-catalyst $SC_{1b}$, in the first device 331 becomes surprisingly efficient. This is a result of sufficient amounts of nitrogen oxides $NO_x$ being present in the exhaust stream 303 at the first slip-catalyst $SC_1$, and/or at the additional first slip-catalyst $SC_{1b}$, in the first device 331, in order for an efficient reduction of nitrogen oxides $NO_x$ to be obtained. In other words, the relatively good availability of nitrogen oxides $NO_x$ at the first slip-catalyst $SC_1$, and/or at the additional first slip-catalyst $SC_{1b}$, may be used to achieve a very good performance, and/or a very good utilization, when a multifunctional slip-catalyst $SC_1$, and/or a multifunctional additional first slip-catalyst $SC_{1b}$, is used in the first catalyst device 331.

The first selective catalytic reduction catalyst $SCR_1$, the first slip-catalyst $SC_1$, and/or the additional first slip-catalyst $SC_{1b}$, may be used with the objective of generating heat, for example by oxidation of hydrocarbons HC in the exhaust stream, which enables regeneration of sulphur contaminated components, such as the catalyst and/or components arranged downstream of the latter. At the regeneration of the sulphur contaminated components, the amount of sulphur intercalated in the components is reduced.

The system according to the present invention may be arranged to carry out all of the method embodiments described above and in the claims, wherein the system for the respective embodiment achieves the above described advantages for the respective embodiment.

A person skilled in the art will also realize that the above system may be modified according to the different embodiments of the method according to the invention. In addition, the invention relates to a motor vehicle 100, for example a truck or a bus, comprising at least one system for treatment of an exhaust stream.

The present invention is not limited to the embodiments of the invention described above, but pertains to and comprises all embodiments within the scope of the enclosed independent claims.

The invention claimed is:

1. A method for treatment of an exhaust stream, resulting from a combustion in a combustion engine, wherein the exhaust stream comprises nitrogen oxides ($NO_x$), comprising nitrogen monoxide (NO) and nitrogen dioxide ($NO_2$), said method comprising:
performing, under active control, a first reduction of a first amount of nitrogen oxides ($NO_{x\_1}$) reaching a first device, arranged in said exhaust treatment system using at least a first slip-catalyst ($SC_1$) comprised in said first device, wherein said first slip-catalyst ($SC_1$) carries out primarily a reduction of nitrogen oxides ($NO_x$) and secondarily an oxidation of potential additive in said exhaust stream, so that performing said first reduction is actively controlled based at least on said first amount of nitrogen oxides ($NO_{x\_1}$) reaching said first device; and
performing a second reduction of a second amount of nitrogen oxides ($NO_{x\_2}$) reaching a second device, arranged downstream of said first device, in order to reduce said second amount of nitrogen oxides ($NO_{x\_2}$).

2. The method according to claim 1, wherein said treatment of said exhaust stream also comprises oxidizing one or more of nitrogen oxide (NO) and incompletely oxidized carbon compounds, in said exhaust stream, wherein said oxidation occurs at least in one substrate with oxidizing coating, arranged downstream of said first device.

3. The method according to claim 1, further comprising:
supplying a first additive into said exhaust stream upstream of said first device; and
said performing a first reduction comprises performing a first reduction of said first amount of nitrogen oxides ($NO_{x\_1}$), with a first selective catalytic reduction catalyst ($SCR_1$) prior to said primary reduction of nitrogen oxides ($NO_x$), and said secondary oxidation of potential additive in said exhaust stream with said first slip-catalyst ($SC_1$).

4. The method according to claim 3, wherein said performing a first reduction is also actively controlled based on a coverage degree for additive for said first selective catalytic reduction catalyst ($SCR_1$), and/or for said first slip-catalyst ($SC_1$).

5. The method according to claim 3, wherein said performing a first reduction is also actively controlled based on at least one catalytic characteristic for said first device.

6. The method according to claim 3, wherein said performing a first reduction is also actively controlled based on a temperature for said first selective catalytic reduction catalyst $T_{SCR1}$, and/or for said first slip-catalyst $T_{SC1}$.

7. The method according to claim 3, wherein said performing a first reduction is also actively controlled based on how much of said first amount of nitrogen oxides ($NO_{x\_1}$) that can be stored, and/or reduced, by said first device.

8. The method according to claim 3, wherein said supplying a first additive into said exhaust stream comprising supplying said first additive such that a coverage degree for said first additive in said first selective catalytic reduction catalyst ($SCR_1$) exceeds a value for a maximum coverage degree for additive in said first selective catalytic reduction catalyst ($SCR_1$).

9. The method according to claim 3, wherein said supplying a first additive into said exhaust stream results in a slip of additive out from said first selective catalytic reduction catalyst ($SCR_1$).

10. The method according to claim 9, wherein said slip of additive out of said first selective catalytic reduction catalyst ($SCR_1$) is substantially stored and/or oxidized in said first slip-catalyst ($SC_1$).

11. The method according to claim 10, wherein said supplying a first additive into said exhaust stream is reduced such that a coverage degree for said first selective catalytic reduction catalyst ($SCR_1$) drops, when a coverage degree for said first additive in said first slip-catalyst ($SC_1$) exceeds a value for a maximum coverage degree for additives in said first slip-catalyst ($SC_1$).

12. The method according to claim 3, further comprising:
storing of nitrogen oxides ($NO_x$) with a $NO_x$-storing catalyst (NCC), arranged upstream of said first selective catalytic reduction catalyst ($SCR_1$), prior to said performing a first reduction of said first amount of nitrogen oxides ($NO_{x\_1}$) with a first selective catalytic reduction catalyst ($SCR_1$).

13. The method according to claim 3, further comprises:
following said reduction of nitrogen oxides ($NO_x$), and/or oxidation of potential additive, in said exhaust stream with said first slip-catalyst ($SC_1$), storing nitrogen oxides ($NO_x$) with a $NO_x$-storing catalyst (NCC) arranged downstream of said first slip-catalyst ($SCR_1$).

14. The method according to claim 3, wherein said performing a first reduction is also actively controlled based on a coverage degree of nitrogen oxides ($NO_x$) in a $NO_x$-storing catalyst (NCC) included in said first device.

15. The method according to claim 1, wherein said performing a first reduction further comprises storing nitrogen oxides ($NO_x$) with a NOx-storing catalyst (NCC).

16. The method according to claim 1, wherein said performing a first reduction is also actively controlled based on a determined value $(NO_{2\_2}/NO_{x\_2})_{det}$ for a second ratio between a second amount of nitrogen dioxide ($NO_{2\_2}$), and said second amount of nitrogen oxides ($NO_{x\_2}$) reaching said second device.

17. The method according to claim 16, wherein said performing a first reduction reduces a value $(NO_{2\_2}/NO_{x\_2})$ for said second ratio, wherein said reducing is achieved by increasing said second amount of nitrogen oxides ($NO_{x\_2}$).

18. The method according to claim 17, wherein said reducing of said value $(NO_{2\_2}/NO_{x\_2})$ for said second ratio is achieved by active control of said performing a first reduction of said first amount of nitrogen oxides ($NO_{x\_1}$) so that there is reduced reduction of said first amount of nitrogen oxides ($NO_{x\_1}$) in said first device, so that said second amount of nitrogen oxides ($NO_{x\_2}$) increases.

19. The method according to claim 16, further comprising:
supplying a first additive into said exhaust stream upstream of said first device, wherein said first supply is based on said determined value $(NO_{2\_2}/NO_{x\_2})_{det}$ for said second ratio, so that a high determined value $(NO_{2\_2}/NO_{x\_2})_{det}$ for said second ratio results in supply of less additive, than what a low determined value $(NO_{2\_2}/NO_{x\_2})_{det}$ results in.

20. The method according to claim 19, wherein said first supply of additive is reduced, if said determined value $(NO_{2\_2}/NO_{x\_2})_{det}$ for said second ratio is greater than an upper threshold value $(NO_{2\_2}/NO_{x\_2})_{threshold\_high}$, $(NO_{2\_2}/NO_{x\_2})_{det} > (NO_{2\_2}/NO_{x\_2})_{threshold\_high}$.

21. The method according to claim 20, wherein said upper threshold value $(NO_{2\_2}/NO_{x\_2})_{threshold\_high}$ has a value that depends on one or more of:
catalytic characteristics for said first device;
catalytic characteristics for said second device a catalyst type for said first device;
a catalyst type for said second device;
a temperature interval within which said first device is active;
a temperature interval within which said second device is active;
a coverage degree of additive for said first device;
a coverage degree of additive for said second device;
a temperature at said first device; and
a temperature at said second device.

22. The method according to claim 20, wherein said upper threshold value $(NO_{2\_2}/NO_{x\_2})_{threshold\_high}$ has a value within an interval of one of:
$(NO_{2\_2}/NO_{x\_2})_{threshold\_high} > 50\%$;
$50\% < (NO_{2\_2}/NO_{x\_2})_{threshold\_high} \leq 85\%$; and
$60\% < (NO_{2\_2}/NO_{x\_2})_{threshold\_high} \leq 75\%$.

23. The method according to claim 16, wherein said performing a first reduction comprises reducing said second amount of nitrogen oxides ($NO_{x\_2}$) to thereby achieve an increase of a value ($NO_{2\_2}/NO_{x\_2}$) for said second ratio.

24. The method according to claim 23, wherein said performing a first reduction comprises increasing reduction of said first amount of nitrogen oxides ($NO_{x\_1}$) in said first device, so that said second amount of nitrogen oxides ($NO_{x\_2}$) is reduced and an increase of said value ($NO_{2\_2}/NO_{x\_2}$) for said second ratio is achieved.

25. The method according to claim 16, further comprising:
supplying a first additive into said exhaust stream upstream of said first device, wherein said first supply is based on said determined value $(NO_{2\_2}/NO_{x\_2})_{det}$ for said second ratio, so that a low determined value $(NO_{2\_2}/NO_{x\_2})_{det}$ for said second ratio results in supply of more additive, than what a high determined value $(NO_{2\_2}/NO_{x\_2})_{det}$ results in.

26. The method according to claim 23, wherein said supplying a first additive into said exhaust stream increases if said determined value $(NO_{2\_2}/NO_{x\_2})_{det}$ for said second ratio is smaller than, or equal to, a lower threshold value $(NO_{2\_2}/NO_{x\_2})_{threshold\_low}$, $(NO_{2\_2}/NO_{x\_2})_{det} \leq (NO_{2\_2}/NO_{x\_2})_{threshold\_low}$.

27. The method according to claim 26, wherein said lower threshold value $(NO_{2\_2}/NO_{x\_2})_{threshold\_low}$ has a value that depends on one or more of:
catalytic characteristics for said first device;
catalytic characteristics for said second device
a catalyst type for said first device;
a catalyst type for said second device;
a temperature interval within which said first device is active;
a temperature interval within which said second device is active;
a coverage degree of additive for said first device;
a coverage degree of additive for said second device;
a temperature at said first device; and
a temperature at said second device.

28. The method according to claim 26, wherein said lower threshold value $(NO_{2\_2}/NO_{x\_2})_{threshold\_low}$ has a value within an interval of one of:
$(NO_{2\_2}/NO_{x\_2})_{threshold\_low} < 50\%$;
$10\% (NO_{2\_2}/NO_{x\_2})_{threshold\_low} \leq 40\%$; and
$20\% \leq (NO_{2\_2}/NO_{x\_2})_{threshold\_low} \leq 60\%$.

29. The method according to claim 1, wherein:
said second amount of nitrogen oxides $NO_{x\_2}$ corresponds to a second ratio $(NO_{2\_2}/NO_{x\_2})$, between a second amount of nitrogen dioxide ($NO_{2\_2}$) and a second amount of nitrogen oxides ($NO_{x\_2}$, reaching said second device; and
said first supply of said first additive is controlled, based on a determined value $(NO_{2\_2}/NO_{x\_2})_{det}$ for said second ratio, so that a fast reduction may be used in said second device.

30. The method according to claim 16, wherein said determined value for a first value $(NO_{2\_1}/NO_{x\_1})_{det}$ for a ratio between a first amount of nitrogen dioxide $NO_{2\_1}$ and a first amount of nitrogen oxides ($NO_{x\_1}$) reaching the first device, and/or said second $(NO_{x\_2}/NO_{x\_2})_{det}$ ratio, comprises one of:
a measured value;
a modelled value; and
a predicted value.

31. The method according to claim 1, wherein said performing a first reduction is achieved through the use of one or more of:
a control of a dosage of additive at said first device;
a control of a temperature at said first device; and
a control of an exhaust environment at said first device.

32. A computer program product for treatment of an exhaust stream, which results from a combustion in a combustion engine, wherein the exhaust stream comprises nitrogen oxides ($NO_x$), comprising nitrogen monoxide (NO) and nitrogen dioxide ($NO_2$), wherein said computer program product comprising computer program code stored on a non-transitory computer readable medium, said computer program code comprising computer instructions to cause one or more computer processors to perform:
performing, under active control, a first reduction of a first amount of nitrogen oxides ($NO_{x\_1}$) reaching a first device, arranged in said exhaust treatment system using at least a first slip-catalyst ($SC_1$) comprised in said first device, wherein said first slip-catalyst ($SC_1$) carries out primarily a reduction of nitrogen oxides ($NO_x$), and secondarily an oxidation of potential additive in said exhaust stream, so that performing said first reduction is actively controlled based at least on said first amount of nitrogen oxides ($NO_{x\_1}$) reaching said first device; and
performing a second reduction of a second amount of nitrogen oxides ($NO_{x\_2}$) reaching a second device, arranged downstream of said first device, in order to reduce said second amount of nitrogen oxides ($NO_{x\_2}$).

33. An exhaust treatment system, arranged for treatment of an exhaust stream resulting from a combustion in a combustion engine, wherein the exhaust stream comprises nitrogen oxides ($NO_x$), comprising nitrogen monoxide (NO) and nitrogen dioxide ($NO_2$), said system comprising:
a first device, arranged in said exhaust treatment system to provide a first reduction of a first amount of nitrogen oxides ($NO_{x\_1}$) reaching said first device, wherein said first reduction is carried out with the use of at least a first slip-catalyst ($SC_1$), comprised in said first device, wherein said first slip-catalyst ($SC_1$) carries out primarily a reduction of nitrogen oxides ($NO_x$), and secondarily an oxidation of potential additive in said exhaust stream, and wherein said first reduction is actively controlled by said first device based at least on said first amount of nitrogen oxides ($NO_{x\_1}$) reaching said first device; and
a second device, arranged downstream of said first device, to provide a second reduction of a second amount of nitrogen oxides ($NO_{2\_2}$) reaching said second device.

34. The exhaust treatment system according to claim 33, wherein said first catalyst device comprises one of:
- a first selective catalytic reduction catalyst ($SCR_1$), followed downstream by said first slip-catalyst ($SC_1$);
- said first slip-catalyst ($SC_1$), followed downstream by a first selective catalytic reduction catalyst ($SCR_1$);
- said first slip-catalyst ($SC_1$), followed downstream by a first selective catalytic reduction catalyst ($SC_1$), followed downstream by an additional first slip-catalyst ($SC_{1b}$), wherein said additional first slip-catalyst ($SC_{1b}$) is arranged to oxidize additive, and/or to assist said first selective catalytic reduction catalyst ($SCR_1$) with a reduction of nitrogen oxides ($NO_x$) in said exhaust stream;
- said first slip-catalyst ($SC_1$);
- said first slip-catalyst ($SC_1$), followed downstream by a first selective catalytic reduction catalyst ($SCR_1$), combined with a purely oxidizing coating in its outlet part;
- a first selective catalytic reduction catalyst ($SCR_1$), followed downstream by said first slip-catalyst ($SC_1$), followed downstream by a $NO_x$-storing catalyst (NCC);
- a $NO_x$-storing catalyst (NCC), followed downstream by a first selective catalytic reduction catalyst ($SCR_1$), followed downstream by said first slip-catalyst ($SC_1$);
- a $NO_x$-storing catalyst (NCC), followed downstream by a first selective catalytic reduction catalyst ($SCR_1$), followed downstream by said first slip-catalyst ($SC_1$), followed downstream by an additional $NO_x$-storing catalyst ($NCC_b$); and
- said first slip-catalyst ($SC_1$) and a $NO_x$-storing catalyst (NCC).

35. The exhaust treatment system according to claim 33, wherein said second device comprises one of:
- a second selective catalytic reduction catalyst ($SCR_2$); and
- a second selective catalytic reduction catalyst ($SCR_2$), followed downstream by a second slip-catalyst ($SC_2$), wherein said second slip-catalyst ($SC_2$) is arranged to oxidize a residue of additive, and/or to assist said second selective catalytic reduction catalyst ($SCR_2$) with an additional reduction of nitrogen oxides ($NO_x$) in said exhaust stream.

* * * * *